United States Patent
Bacque et al.

(10) Patent No.: US 7,139,069 B2
(45) Date of Patent: Nov. 21, 2006

(54) METHODS AND APPARATUS FOR DETECTING A FAULTY COMPONENT LOCATION ALONG AN OPTICAL PATH IN AN OPTICAL NETWORK

(75) Inventors: James Benson Bacque, Ottawa (CA); Ping Wai Wan, Kanata (CA); Derrick Remedios, Nepean (CA); Eddie Kai Ho Ng, Ottawa (CA)

(73) Assignee: Tropic Networks Inc., Kanata (CA)

( * ) Notice: Subject to any disclaimer, the term of this patent is extended or adjusted under 35 U.S.C. 154(b) by 98 days.

(21) Appl. No.: 11/065,098

(22) Filed: Feb. 25, 2005

(65) Prior Publication Data

US 2005/0190359 A1    Sep. 1, 2005

Related U.S. Application Data

(60) Provisional application No. 60/547,628, filed on Feb. 26, 2004.

(51) Int. Cl.
*G01N 21/00* (2006.01)
(52) U.S. Cl. .................................................. 356/73.1
(58) Field of Classification Search ..................... None
See application file for complete search history.

(56) References Cited

U.S. PATENT DOCUMENTS 6,115,154 A * 9/2000 Antoniades et al. ........... 398/4
6,980,287 B1 * 12/2005 Renard et al. ............. 356/73.1
7,031,606 B1 * 4/2006 Liu et al. ...................... 398/13

* cited by examiner

*Primary Examiner*—Tu T. Nguyen
(74) *Attorney, Agent, or Firm*—Victoria Donnelly

(57) ABSTRACT

A multi-stage method and apparatus for determining a faulty component location along an optical path through an optical fiber in an optical network are disclosed. A total power of the optical fiber, and a total wavelength power as a sum of powers of the individual wavelengths at a plurality of local detection points are measured and compared at the local detection points, followed by determining whether or not a faulty detection point exists along the optical path. If a fault is identified, the method provides a multi-stage fault detection procedure, including measuring a total wavelength power loss between a local detection point and an adjacent detection point, between the local detection point and multiple non-adjacent detection points, and a correlation of the measured total wavelength power losses between the various detection points. A corresponding apparatus for determining the faulty component location in the optical network is also provided.

50 Claims, 12 Drawing Sheets

METHODS AND APPARATUS FOR DETECTING A FAULTY COMPONENT LOCATION ALONG AN OPTICAL PATH IN AN OPTICAL NETWORK

This application claims priority from U.S. Provisional Patent Application Ser. No. 60/547,628 to BACQUE et al., entitled "Fault correlation—wavelength tracker (WT) self-checking mechanism", and filed on 26 Feb. 2004.

FIELD OF INVENTION

The invention relates to optical telecommunication networks, and in particular, to methods and apparatus for detecting a faulty component location along an optical path through an optical fiber in an optical network.

BACKGROUND OF INVENTION

Fault management in an optical network is challenging procedure because of the complexity of the optical layer. Most prior art methods of fault management in optical networks are usually limited to detecting faulty communication links and nodes, which, in turn, leads to either replacing the faulty communication link or taking the faulty node out of service, and accordingly impacting network services.

Existing prior art methods of fault detection in optical networks lack the ability to determine whether the detected faults are indicative of one specific problem or a symptom of another problem, and hence, multiple faults may need to be detected and correlated in order to identify a particular problem, which causes these faults.

Consequently, there is a need in the industry to provide an improved methods and apparatus for detecting and correlating faults in optical networks.

SUMMARY OF THE INVENTION

It is an object of the present invention to provide methods and apparatus for detecting a faulty component location along an optical path through an optical fiber in an optical network.

The invention, therefore, according to one aspect provides a method for determining a faulty component location along an optical path through an optical fiber in an optical network. The optical fiber carries a plurality of individual wavelengths, wherein the individual wavelengths are modulated by a low frequency dither tone for identification purposes and performance monitoring in the optical network.

In accordance with a first embodiment of this invention, the method comprises measuring a total power of the optical fiber and a total wavelength power of the individual wavelengths at a plurality of local detection points along the optical path. If a discrepancy between the total power of the optical fiber and the total wavelength power exceeding an accuracy of measurements is detected at a local detection point, determining that a faulty detection point or a component may exist along the optical path.

The method comprises measuring a loss of a total wavelength power between a local detection point and a detection point adjacent to the local detection point. For each pair of the local and adjacent detection points, if the loss of the total wavelength power is greater than a reference loss value for the respective pair, determining whether or not a fault occurs at the local detection point, a fault occurs at the adjacent detection point, or a faulty component is located between the local detection point and the adjacent detection point to said local detection point.

The difference between the total power of the optical fiber ($P_{total}$) and the total wavelength power ($P_S$) of the individual wavelengths of the optical fiber is given by the following formula:

Difference-in-Power=$P_{total}$-$P_S$, and $$P_S = \sum_{j=1}^{M} P_j,$$

wherein $P_j$ is an individual wavelength power for a $j^{th}$ wavelength, and M is a number of wavelengths of said optical fiber. If the (Difference-in-Power) is greater than a pre-determined value (X) and less than a pre-determined value (Y), determining that a faulty detection point or a component may exist along the optical path. The pre-determined value (X) is about "3 dB", and the pre-determined value (Y) is about "−1 dB".

The loss of the total wavelength power is determined as follows:

$$L_{k,k+1} = (1/M) * \sum_{j=1}^{M} (P_{k_j} - P_{k+1_j})$$

wherein $P_{k_j}$ is a power of a $j^{th}$ wavelength at the local detection point (k), $P_{k+1_j}$ is a power of the $j^{th}$ wavelength at the adjacent detection point (k+1), and M is a number of wavelengths of said optical fiber.

The method further comprises computing the loss of the total wavelength power at a pre-determined time (T1), ($L_{k,k+1}|_{T1}$); setting the respective reference loss value to be equal to ($|L_{k,k+1}|_{T1}|-V$), wherein (V) equals to a pre-determined value; computing the total wavelength power loss at another pre-determined time (T2>T1), ($L_{k,k+1}|_{T2}$) If the $|L_{k,k+1}|_{T2}|$ is less than the respective reference loss value ($|L_{k,k+1}|_{T1}|-V$), determining that a faulty component is located between the local detection point and the adjacent detection point. The pre-determined value (V) is about 1 dB. The T2 is a current instance of time, and T2−T1=Δ, wherein Δ is about 1 month; about 1 week; about 1 day; about 1 hour; about 1 minute; or about 1 second. Further, averaging each of the respective ($L_{k,k+1}|_{T1}$) values over a time interval ΔT1 preceding T1, and averaging each of the respective ($L_{k,k+1}|_{T2}$) values over a time interval ΔT2 preceding T2.

The loss of the total wavelength power is also determined as follows:

$$L_{k,k+1} = (1/M) * \left( \sum_{j=1}^{M} P_{k_j} - \sum_{j=1}^{M} P_{k+1_j} \right)$$

wherein $P_{k_j}$ is a power of a $j^{th}$ wavelength at the local detection point (k), $P_{k+1_j}$ is a power of the $j^{th}$ wavelength at the adjacent detection point (k+1), and M is a number of wavelengths of said optical fiber. The method comprises computing the loss of the total wavelength power at a pre-determined time (T1), ($L_{k,k+1}|_{T1}$); setting the respective reference loss value to be equal to ($|L_{k,k+1}|_{T1}|-V$), wherein (V) equals to a pre-determined value; computing the total wavelength power loss at another pre-determined time (T2>T1), ($L_{k,k+1}|_{T2}$) If the $|L_{k,k+1}|_{T2}|$ is less than the respective reference loss value ($|L_{k,k+1}|_{T1}|-V$), determining that a faulty component is located between the local detection point and the adjacent detection point. The pre-determined value (V) is about 1 dB. The T2 is a current instance of time, and T2–T1=Δ, wherein Δ is about 1 month; about 1 week; about 1 day; about 1 hour; about 1 minute; or about 1 second. The method comprises averaging each of the respective ($L_{k,k+1}|_{T1}$) values over a time interval ΔT1 preceding T1, and averaging each of the respective ($L_{k,k+1}|_{T2}$) values over a time interval ΔT2 preceding T2.

In accordance with a second embodiment of this invention, the method comprises measuring a loss of a total wavelength power between a local detection point and a detection point which is non-adjacent to said local detection point. For each pair of the local and non-adjacent detection points, if the loss of the total wavelength power is less than a reference loss value for the respective pair, determining whether or not a faulty component is located between the local detection point and the adjacent detection point, or a faulty component is located between the local detection point and the non-adjacent detection point.

The method comprises determining the loss of the total wavelength power as follows:

$$L_{k,k+i} = (1/M) * \sum_{j=1}^{M} (P_{k_j} - P_{k+i_j}),$$

wherein $P_{k_j}$ is a power of a $j^{th}$ wavelength at the local detection point (k), $P_{k+i_j}$ is a power of the $j^{th}$ wavelength at the adjacent detection point (k+i), i=1, 2, - - -, N–1 and N is the total number of detection points along the optical path, and M is a number of wavelengths of said optical fiber.

The method comprises computing the loss of the total wavelength power at a pre-determined time (T1), ($L_{k,k+i}|_{T1}$); setting the respective reference loss value to be equal to ($|L_{k,k+i}|_{T1}|-W$), wherein (W) equals to a pre-determined value; computing the total wavelength power loss at another pre-determined time (T2>T1), ($L_{k,k+i}|_{T2}$).

If the $|L_{k,k+i}|_{T2}|$ is less than the respective reference loss value ($|L_{k,k+i}|_{T1}|-W$), determining that a faulty component is located between the local detection point and the non-adjacent detection point. The pre-determined value (W) is about 1 dB. The T2 is a current instance of time, and T2–T1=Δ, wherein Δ is about 1 month; about 1 week; about 1 day; about 1 hour; about 1 minute; or about 1 second. The method comprises averaging each of the respective ($L_{k,k+i}|_{T1}$) values over a time interval ΔT1 preceding T1, and averaging each of the respective ($L_{k,k+i}|_{T2}$) values over a time interval ΔT2 preceding T2.

Another aspect of this invention provides a method of determining the loss of the total wavelength power as follows:

$$L_{k,k+i} = (1/M) * \left( \sum_{j=1}^{M} P_{k_j} - \sum_{j=1}^{M} P_{k+i_j} \right),$$

wherein $P_{k_j}$ is a power of a $j^{th}$ wavelength at the local detection point (k), $P_{k+i_j}$ is a power of the $j^{th}$ wavelength at the adjacent detection point (k+i), i=1, 2, N–1 and N is the total number of detection points along the optical path, and M is a number of wavelengths of said optical fiber. The method comprises computing the loss of the total wavelength power at a pre-determined time (T1), ($L_{k,k+i}|_{T1}$); setting the respective reference loss value to be equal to ($|L_{k,k+i}|_{T1}|-W$), wherein (W) equals to a pre-determined value; computing the total wavelength power loss at another pre-determined time (T2>T1), ($L_{k,k+i}|_{T2}$). If the $L_{k,k+i}|_{T2}$ in step (t) is less than the respective reference loss value ($|L_{k,k+i}|_{T1}-W$) in step (s), determining that a faulty component is located between the local detection point and the non-adjacent detection point. The pre-determined value (W) is about 1 dB. The T2 is a current instance of time, and T2–T1=Δ, wherein Δ is about 1 month; about 1 week; about 1 day; about 1 hour; about 1 minute; or about 1 second. The method comprises averaging each of the respective ($L_{k,k+i}|_{T1}$) values over a time interval ΔT1 preceding T1, and averaging each of the respective ($L_{k,k+i}|_{T2}$) values over a time interval ΔT2 preceding T2, and i=1, 2, N–1 and N is the total number of detection points along the optical path.

Another aspect of the invention provides a method for determining a faulty component location along an optical path through an optical fiber in an optical network. The optical fiber carrying a plurality of individual wavelengths, wherein the individual wavelengths are modulated by a low frequency dither tone for identification purposes and performance monitoring in the optical network.

In accordance with a third embodiment of this invention, the method comprises measuring a loss of a total wavelength power between a local detection point and a detection point adjacent to said local detection point. For each pair of the local and adjacent detection points, if the loss of the total wavelength power is less than a reference loss value for the respective pair, determining whether or not a fault occurs at the local detection point, a fault occurs at the adjacent detection point, or a faulty component is located between the local detection point and the adjacent detection point.

The method further comprises measuring a loss of a total wavelength power between the local detection point and a detection point, which is non-adjacent to, the local detection point. For each pair of the local and non-adjacent detection points, if the loss of the total wavelengths power is less than a reference loss value for the respective pair, determining whether or not a fault occurs at the non-adjacent detection point, a faulty component is located between the local detection point and the adjacent detection point, and a faulty component is located between the local detection point and the non-adjacent detection point.

In one aspect of this embodiment, the method comprises determining the loss of the total wavelength power as follows:

$$L_{k,k+1} = (1/M) * \sum_{j=1}^{M} (P_{k_j} - P_{k+1_j}),$$

wherein $P_{k_j}$ is a power of a $j^{th}$ wavelength at the local detection point (k), $P_{k+1_j}$ is a power of the $j^{th}$ wavelength at the adjacent detection point (k+1), and M is a number of wavelengths of said optical fiber. The method comprises computing the loss of the total wavelength power at a pre-determined time (T1), ($L_{k,k+1}|_{T1}$); setting the respective reference loss value to be equal to ($|L_{k,k+1}|_{T1}|-V$), wherein (V) equals to a pre-determined value; computing the total wavelength power loss at another pre-determined time (T2>T1), ($L_{k,k+1}|_{T2}$). If the $|L_{k,k+1}|_{T2}|$ in step (t) is less than the respective reference loss value ($|L_{k,k+1}|_{T1}|-V$), determining that a faulty component is located between the local detection point and the adjacent detection point. The pre-determined value (V) is about 1 dB. The T2 is a current instance of time, and T2−T1=Δ, wherein Δ is about 1 month; about 1 week; about 1 day; about 1 hour; about 1 minute; or about 1 second. The method comprises averaging each of the respective ($L_{k,k+1}|_{T1}$) values over a time interval ΔT1 preceding T1, and averaging each of the respective ($L_{k,k+1}|_{T2}$) values over a time interval ΔT2 preceding T2.

In another aspect of this embodiment, the method comprises determining the loss of the total wavelength power as follows:

$$L_{k,k+1} = (1/M) * \left( \sum_{j=1}^{M} P_{k_j} - \sum_{j=1}^{M} P_{k+1_j} \right),$$

wherein $P_{k_j}$ is a power of a $j^{th}$ wavelength at the local detection point (k), $P_{k+1_j}$ is a power of the $j^{th}$ wavelength at the adjacent detection point (k+1), and M is a number of wavelengths of said optical fiber. The method comprises computing the loss of the total wavelength power at a pre-determined time (T1), ($L_{k,k+1}|_{T1}$); setting the respective reference loss value to be equal to ($|L_{k,k+1}|_{T1}|-V$), wherein (V) equals to a pre-determined value; computing the total wavelength power loss at another pre-determined time (T2>T1), ($L_{k,k+1}|_{T2}$). If the $|L_{k,k+1}|_{T2}|$ is less than the respective reference loss value ($|L_{k,k+1}|_{T1}|-V$), determining that a faulty component is located between the local detection point and the adjacent detection point. The pre-determined value (V) is about 1 dB. The T2 is a current instance of time, and T2−T1=Δ, wherein Δ is about 1 month; about 1 week; about 1 day; about 1 hour; about 1 minute; or about 1 second. The method comprises averaging each of the respective ($L_{k,k+1}|_{T1}$) values over a time interval ΔT1 preceding T1, and averaging each of the respective ($L_{k,k+1}|_{T2}$) values over a time interval ΔT2 preceding T2.

In another aspect of this embodiment, the method comprises determining the loss of the total wavelength power as follows:

$$L_{k,k+i} = (1/M) * \sum_{j=1}^{M} \left( P_{k_j} - P_{k+i_j} \right),$$

wherein $P_{k_j}$ is a power of a $j^{th}$ wavelength at the local detection point (k), $P_{k+i_j}$ is a power of the $j^{th}$ wavelength at the adjacent detection point (k+i), i=1, 2, N−1 and N is the total number of detection points along the optical path, and M is a number of wavelengths of said optical fiber. The method further comprises computing the loss of the total wavelength power at a pre-determined time (T1), ($L_{k,k+i}|_{T1}$); setting the respective reference loss value to be equal to ($|L_{k,k+i}|_{T1}|-W$), wherein (W) equals to a pre-determined value; computing the total wavelength power loss at another pre-determined time (T2>T1), ($L_{k,k+i}|_{T2}$). If the $L_{k,k+i}|_{T2}|$ is less than the respective reference loss value ($|L_{k,k+i}|_{T1}|-W$), determining that a faulty component is located between the local detection point and the adjacent detection point. The pre-determined value (W) is about 1 dB. The T2 is a current instance of time, and T2−T1=Δ, wherein Δ is about 1 month; about 1 week; about 1 day; about 1 hour; about 1 minute; or about 1 second. The method comprises averaging each of the respective ($L_{k,k+i}|_{T1}$) values over a time interval ΔT1 preceding T1, and averaging each of the respective ($L_{k,k+i}|_{T2}$) values over a time interval ΔT2 preceding T2, and i=1, 2, N−1 and N is the total number of detection points along the optical path.

In yet another aspect of this embodiment, the method comprises determining the loss of the total wavelength power as follows:

$$L_{k,k+i} = (1/M) * \left( \sum_{j=1}^{M} P_{k_j} - \sum_{j=1}^{M} P_{k+i_j} \right),$$

wherein $P_{k_j}$ is a power of a $j^{th}$ wavelength at the local detection point (k), $P_{k+i_j}$ is a power of the $j^{th}$ wavelength at the adjacent detection point (k+i), i=1, 2, N−1 and N is the total number of detection points along the optical path, and M is a number of wavelengths of said optical fiber. The method further comprises computing the loss of the total wavelength power at a pre-determined time (T1), ($L_{k,k+i}|_{T1}$); setting the respective reference loss value to be equal to ($|L_{k,k+i}|_{T1}|-W$), wherein (W) equals to a pre-determined value; computing the total wavelength power loss at another pre-determined time (T2>T1), ($L_{k,k+i}|_{T2}$). If the $|L_{k,k+i}|_{T2}|$ in step (t) is less than the respective reference loss value ($|L_{k,k+i}|_{T1}|-W$) in step (s), determining that a faulty component is located between the local detection point and the adjacent detection point. The pre-determined value (W) is about 1 dB. The T2 is a current instance of time, and T2−T1=Δ, wherein Δ is about 1 month; about 1 week; about 1 day; about 1 hour; about 1 minute; or about 1 second. The method comprises averaging each of the respective ($L_{k,k+i}|_{T1}$) values over a time interval ΔT1 preceding T1, and averaging each of the respective ($L_{k,k+i}|_{T2}$) values over a time interval ΔT2 preceding T2, and i=1, 2, N−1 and N is the total number of detection points along the optical path.

Another aspect of the invention provides an apparatus for determining a faulty component location along an optical path through an optical fiber in an optical network. The optical fiber carrying a plurality of individual wavelengths.

In accordance with another embodiment of this invention, the apparatus comprises a detector for measuring a total power of the optical fiber and a total wavelength power of the individual wavelengths at each of a plurality of local detection points along the optical path. The apparatus further comprises a comparator for comparing the total power of the optical fiber and the total wavelength power for each of the local detection points, and generating a message alert signal indicating that a faulty detection point may exist along the optical path, if a discrepancy between the total power of the optical fiber and the total wavelength power beyond an accuracy of measurements is detected.

The apparatus further comprises a detector for measuring a loss of a total wavelength power between a local detection point and a detection point adjacent to said local detection point. For each pair of the local and adjacent detection points, a comparator for comparing the loss of the total wavelength power with a respective reference loss value for the pair, and if the total wavelength power loss is less than the respective reference loss value, generating a message alert signal indicating whether or not a fault occurs at the local detection point, a fault occurs at the adjacent detection point, or a faulty component is located between the local detection point and the adjacent detection point.

In accordance with another embodiment of this invention, the apparatus further comprises a detector for measuring a loss of a total wavelength power between a local detection point and a detection point which is non-adjacent to said local detection point; and for each pair of the local and non-adjacent detection points, a comparator for comparing the loss of the total wavelength power with a respective reference loss value for the pair. If the total wavelength power loss is less than the respective reference loss value, generating a message alert signal for indicating whether or not a faulty component is located between the local detection point and the adjacent detection point, and a faulty component is located between the local detection point and the non-adjacent detection point.

A further aspect of the invention provides an apparatus for determining a faulty component location along an optical path through an optical fiber in an optical network. The optical fiber carries a plurality of individual wavelengths. The apparatus comprises a detector for measuring a loss of a total wavelength power between a local detection point and a detection point adjacent to said local detection point. For each pair of the local and adjacent detection points, a comparator for comparing the loss of the total wavelength power with a respective reference loss value for the pair If the total wavelengths power loss is less than the respective reference loss value, generating a message alert signal indicating whether or not a fault occurs at the local detection point, a fault occurs at the adjacent detection point, or a faulty component is located between the local detection point and the adjacent detection point.

The apparatus further comprises a detector for measuring a loss of a total wavelength power between the local detection point and a detection point, which is non-adjacent to, the local detection point. For each pair of the local and non-adjacent detection points, a comparator for comparing the loss of the total wavelength power with a respective reference loss value for the pair. If the total wavelengths power loss is less than the respective reference loss value, generating a message alert signal indicating whether or not a fault occurs at the non-adjacent detection point, a faulty component is located between the local detection point and the adjacent detection point, or a faulty component is located between the local detection point and the non-adjacent detection point.

This invention provides methods and apparatus for detecting a faulty component location along an optical path through an optical fiber in an optical network. The methods provide multi-stage procedures for detecting and identifying a faulty detection point and faulty components in the optical network, which, in turn, facilitate fast repair of the faulty component in the optical network without impacting the network services.

The embodiments of the present invention provide methods and apparatus for detecting a faulty component location along an optical path through an optical fiber in an optical network that would overcome the shortcomings and limitations of the prior arts.

BRIEF DESCRIPTION OF THE DRAWINGS

The invention will be better understood from the following description of preferred embodiments together with reference to the accompanying drawing, in which.

DETAILED DESCRIPTION OF THE PREFERRED EMBODIMENTS

Figure 1:
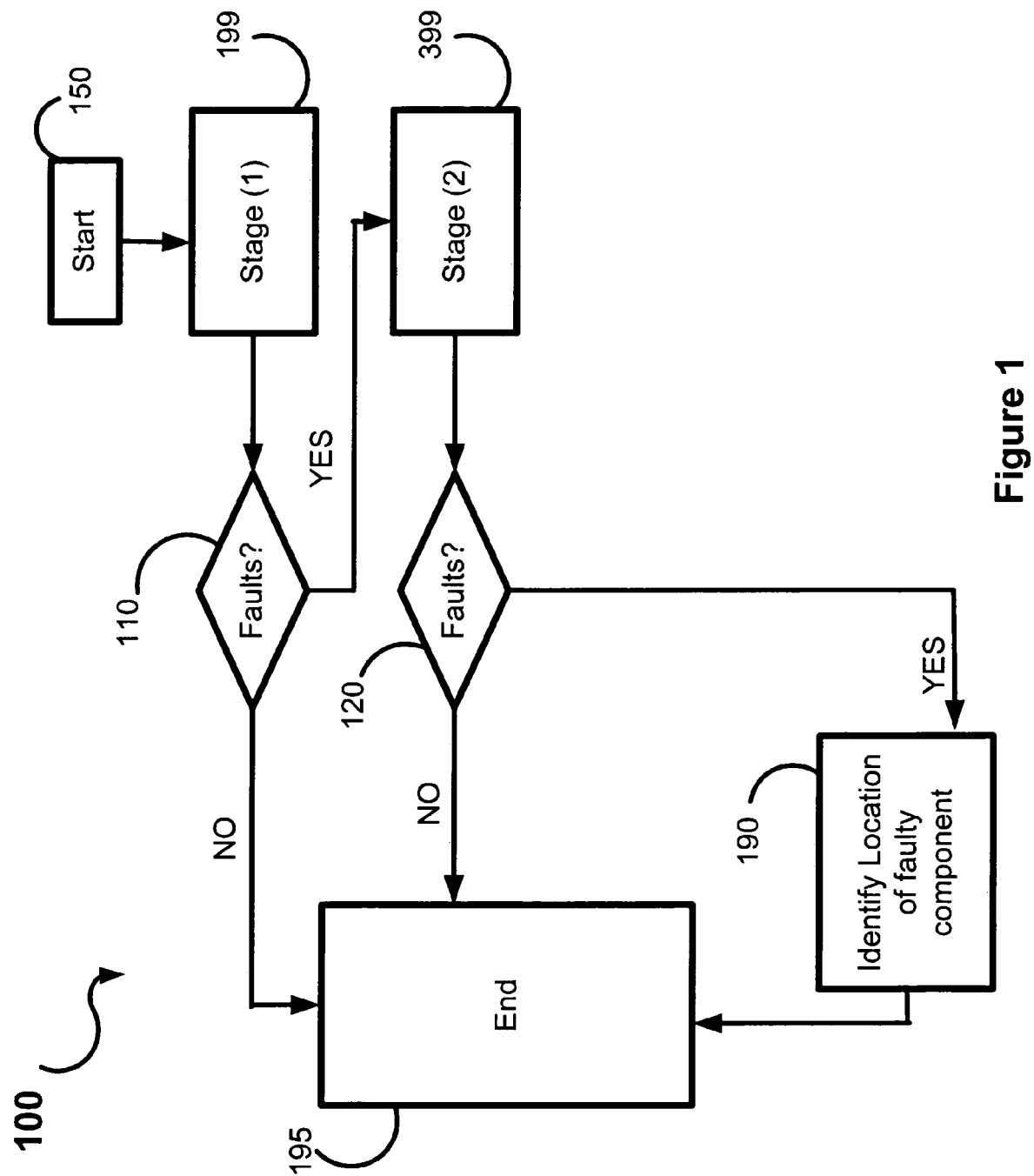
FIG. 1 is a diagram illustrating a multi-stage method for detecting a faulty component location along an optical path through an optical fiber in an optical network in accordance with a first embodiment of the present invention.

FIG. 1 shows a diagram illustrating a multi-stage method 100 for detecting a faulty component location along an optical path through an optical fiber in an optical network in accordance with a first embodiment of the present invention. The optical fiber carries a plurality of individual wavelengths, which may or may not be modulated by low frequency dither tones that are utilized for identification purposes and performance monitoring in the optical network.

Upon start up (block 150), a first-stage fault detection procedure (block 199) is performed, which determines whether or not a faulty detection point exists along the optical path through the optical fiber in the optical network. If a fault is not detected (Exit "NO" from block 110), finishing the first-stage fault detection procedure 199 (block 195). If a fault is detected (Exit "YES" from block 110), performing a second-stage fault detection procedure (block 399). The second-stage fault detection procedure 399 determines whether or not a faulty detection point or a faulty component is detected along the optical path. If a faulty detection point or a faulty component is detected (Exit "YES" from block 120), identifying the location of the faulty detection point and the location of the faulty component (block 190), thus, finishing the method 100 (block 195).

If the fault is not detected (Exit "NO" from block 120), finishing the method 100 (block 195).

Figure 2:
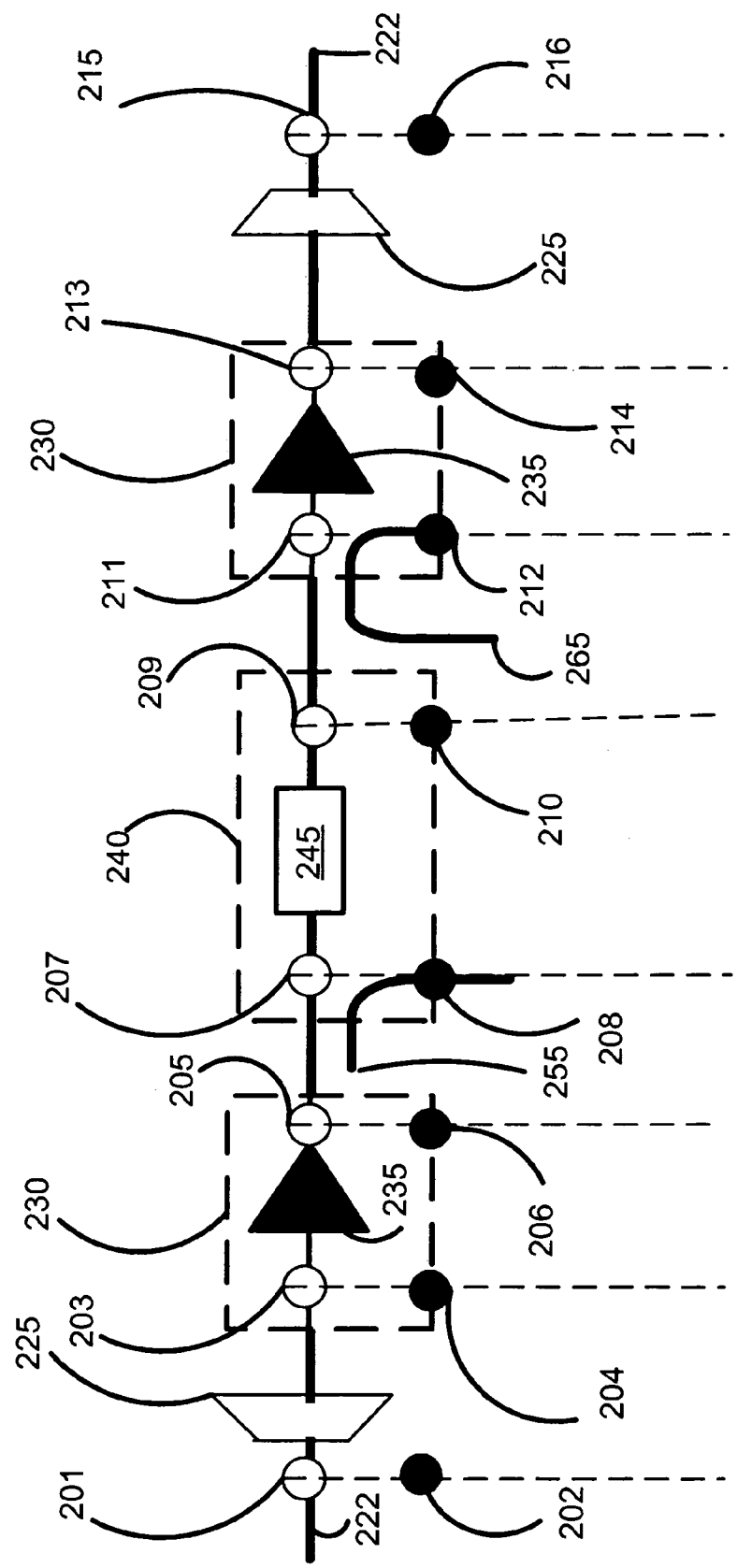
FIG. 2 is a diagram illustrating an apparatus for implementing a first-stage fault detection procedure of the method of FIG. 1.

FIG. 2 shows an apparatus 200 for implementing the first-stage fault detection procedure (block 199 of FIG. 1) of the method of FIG. 1. The apparatus 200 comprises a plurality of detection points 201 to 216 along the optical path through the optical fiber 222 in the optical network, wherein the optical fiber 222 carries a plurality of individual wavelengths, e.g., 255 and 265 in FIG. 2. The optical fiber 222 traverses various optical components, e.g. optical software controllers (OSC) 225, optical equipment 230 having optical amplifiers 235, a ROADM (Reconfigurable optical add/drop multiplexer) 240 having a blocker 245. The detection points 201, 203, 205, 207, 209, 211, 213, 215 are for measuring a total power of the optical fiber 222. The detection-points 202, 204, 206, 208, 210, 212, 214, 216 are for measuring a total wavelength power as a sum of powers of the individual wavelengths, (e.g., 255 and 265 at the respective detection points 208 and 212, respectively).

Figure 3:
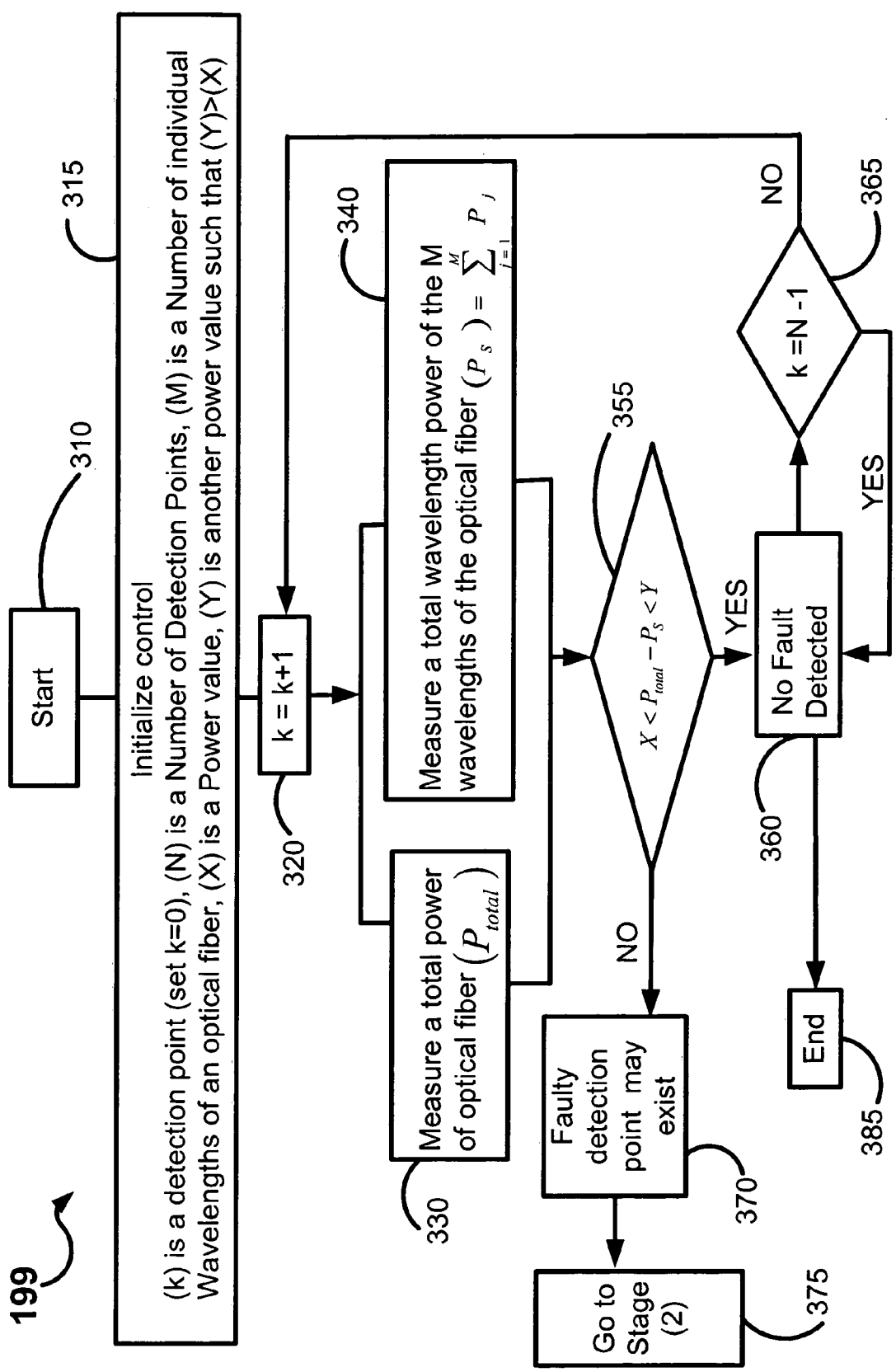
FIG. 3 is a flow chart diagram illustrating the steps of the first-stage fault detection procedure of the method of FIG. 1.

FIG. 3 shows a flow chart diagram 199 illustrating the first-stage detection procedure 199 of the method of FIG. 1 using the apparatus 200 of FIG. 2. Upon start up (block 310), procedure 199 initializes control (block 315) by setting up a number of detection points (N), set an initial detection point k=0, a number of wavelengths (M) of the optical fiber 222 of FIG. 2, a pre-determined power value (X), and a pre-determined power value (Y), such that (Y) is greater than (X). The pre-determined power values (X) and (Y) are based on optical network operation and service management requirements. Each of the values (X) and (Y) is of the order of magnitude of the measurement equipment tolerance. The procedure 199 starts at a local detection point k (block 320) (for example, one of the local detection points 201, 203, 205, 207, 209, 211, 213, 215 in FIG. 2) and measures a total power of the optical fiber 222 of FIG. 2 ($P_{total}$) (block 330) at the local detection point. The total power ($P_{total}$) is equals to the sum of the powers of the individual wavelengths of the optical fiber and the noises on the individual wavelengths.

Additionally, the procedure 199 starts at the local detection point k=k+1 (block 320) (for example, one of the local detection points 202, 204, 206, 208, 210, 212, 214, 216 in FIG. 2) and measures a total wavelength power as a sum of powers of the individual wavelengths, the $P_S$ is given by the following formula:

$$P_S = \sum_{j=1}^{M} P_j, \quad (1)$$

where $P_j$ is an individual wavelength power for a $j^{th}$ wavelength, (e.g., 255 and 265 in FIG. 2 of the optical fiber 222), and (M) is a number of wavelengths of the optical fiber (block 340). The procedure 199 then compares ($P_{total}-P_S$) with the values (X) and (Y) (block 355). If ($P_{total}-P_S$) is not greater than the value (X) and is not less than the value (Y) (Exit "NO" from block 355), the procedure 199 determines that a faulty detection point may exist along the optical path (block 370), and goes to a second-stage fault-detection procedure (block 375) for determining the location of the fault; If ($P_{total}-P_S$) is greater than (X) and less than (Y) (Exit "YES" from block 355), the procedure 199 concludes that there is no fault (block 360), thus, finishing the procedure 199 (block 385). The procedure 199 repeats the fault detection steps at each of the (N) detection points along the optical path (block 365, a loop "NO" from block 365 to block 320), and when all (N) detection points are tested (Exit "NO" from block 365), finishes the procedure 199 (Exit "YES" from block 365 and further to block 385).

Figure 4:
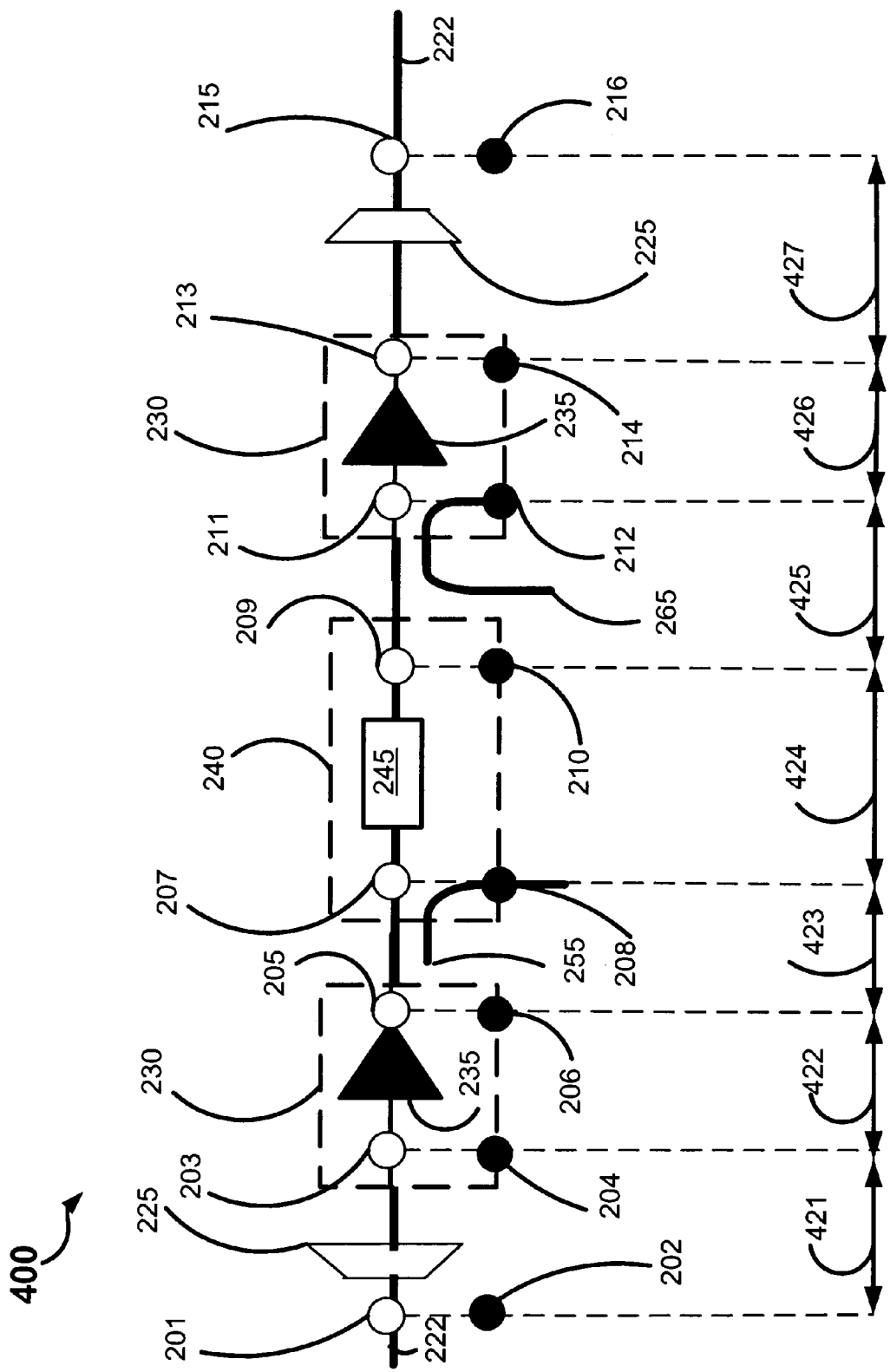
FIG. 4 is a diagram illustrating an apparatus for implementing a second-stage fault detection procedure of the method of FIG. 1.

FIG. 4 shows an apparatus 400 for implementing the second-stage fault detection procedure 399 of the method of FIG. 1. The apparatus 400 is similar to the apparatus 200 of FIG. 200, and similar elements on both figures are designated by same reference numerals. The apparatus 400 comprises a plurality of detection points 201 to 216 along the optical path through the optical fiber 222 in the optical network, the optical fiber 222 carries a plurality of individual wavelengths 255 and 265. The optical fiber 222 traverses various optical components, including optical software controllers (OSC) 225, optical equipment 230 having optical amplifiers 235, a ROADM (Reconfigurable optical add/drop multiplexer) 240 having a blocker 245. The apparatus 400 provides for measuring a loss of wavelength power between a local detection point and its adjacent detection point that is represented by double arrowed lines designated with reference numerals 421 to 427 in FIG. 4, wherein 424 represents measuring the loss of wavelength power for the individual wavelength 255 between the local detection point 208 and the adjacent local detection point 210, 425 represents measuring the loss of wavelength power of the individual wavelength 265 between the local detection point 210 and the adjacent local detection point 212, and so on.

Figure 5:
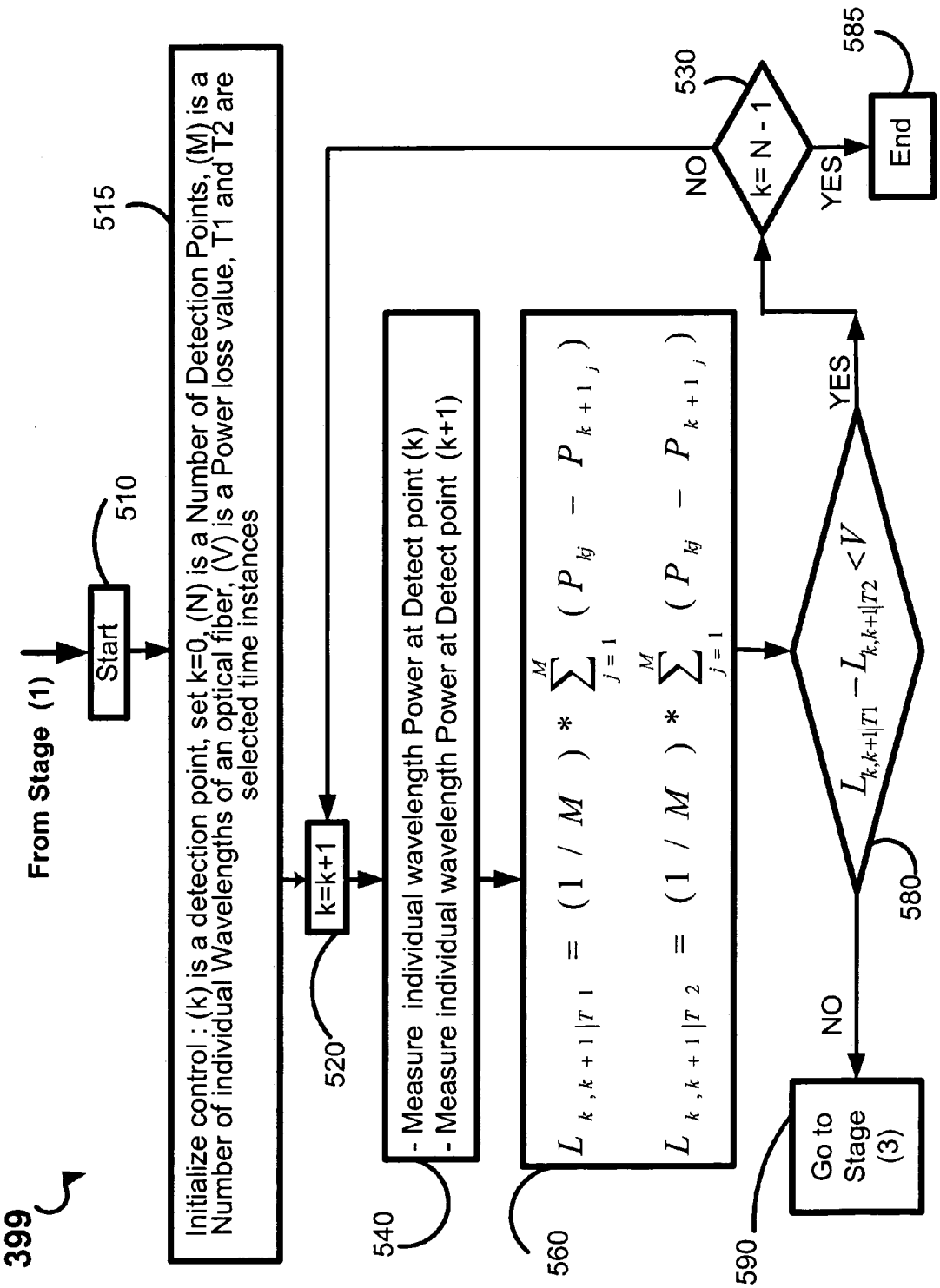
FIG. 5 is a flow chart diagram illustrating the steps of the second-stage fault detection procedure of the method of FIG. 1.

FIG. 5 shows a flow chart diagram 399 illustrating the second-stage detection procedure 399 of the method of FIG. 1 and implemented with the aid of the apparatus 200 of FIG. 4. Upon start up (block 510), procedure 399 initializes control (block 515) by setting up a number of detection points (N) and k=0, a number of wavelengths (M) of the optical fiber 222 of FIG. 4, a pre-determined power value (V), and time instances (T1) and (T2) such that T2>T1. The pre-determined power value (V) is based on optical network operation and service management requirements. The value (V) is of the order of magnitude of the measurement equipment tolerance. Conveniently, the time (T1) may represent the first day of the operation of a component deployed in the optical network, and the time (T2) may represents an instant of time which is later than T1 by a predetermined interval of time Δ, e.g. by about one day, or about one month, or about one week, or about one hour, or about one minute or about a second later. The value of Δ will depend on the particulars of the network configuration and exploitation. Alternatively, it is possible to select T2 as a current time, and T2−T1=Δ which means that T1 happens earlier than T2 by the time interval Δ. Yet alternatively, the loss of the total wavelength power may be averaged over a predetermined period of time, e.g. each of the respective ($L_{k,k+1}|_{T1}$) values may be averaged over a time interval ΔT1 preceding T1, wherein the loss of the total wavelength power at time instance T1, $L_{k,k+1}|_{T1}$, is given by the following formula:

$$L_{k,k+1}|_{T1} = (1/M) * \sum_{j=1}^{M} (P_{k_j} - P_{k+1_j}), \quad (2)$$

where $P_{k_j}$ is a $j^{th}$ wavelength power at the local detection point (k) and $P_{k+1_j}$ is the $j^{th}$ wavelength power at the adjacent detection point (k+1), and each of the respective ($L_{k,k+1}|_{T2}$) values may be averaged over a time interval ΔT2 preceding T2, wherein ΔT1 and ΔT2 may be selected as required, the $L_{k,k+1}|_{T2}$ is the loss of the total wavelength power at time instance T2 and is given by the following formula:

$$L_{k,k+1}|_{T2} = (1/M) * \sum_{j=1}^{M} (P_{k_j} - P_{k+1_j}),  \quad (3)$$

The procedure 399 starts at a local detection point (k) (block 520) for measuring the total wavelength power (blocks 540) at the local detection point (k) and its adjacent detection point (k+1), respectively. The procedure 399 determines the loss of the total wavelength power of the (M) wavelengths at the time (T1) and at the time (T2) (block 560). The procedure 399 further compares the difference between the loss of the total wavelengths power at the time (T1) and at the time (T2) with a pre-determined value (V) (block 580). The value (V) is of the order of magnitude of the measurement equipment tolerance.

If the difference between the loss of the total wavelength power at the time (T1) and the time (T2) is greater than (V) (Exit "NO" from block 580), the procedure 399 concludes that a faulty component may exist, and goes to a third-stage fault detection procedure (block 590) for further determining the location of the faulty component. If the difference between the losses of the total wavelength power at the time (T1) and at the time (T2) is less than the pre-determined value (V), the procedure 399 concludes that there is no fault (Exit "YES" from block 580), followed by finishing the procedure 399 (block 585). The procedure 399 repeats the fault detection steps for each of the (N) detection points (a loop formed by "YES exit from block 580, exit "NO" from block 530, and then to block 520) and when all (N) detection points (block 530) are tested (Exit "YES" from block 530), finishing the procedure 399 (block 585).

Figure 6:
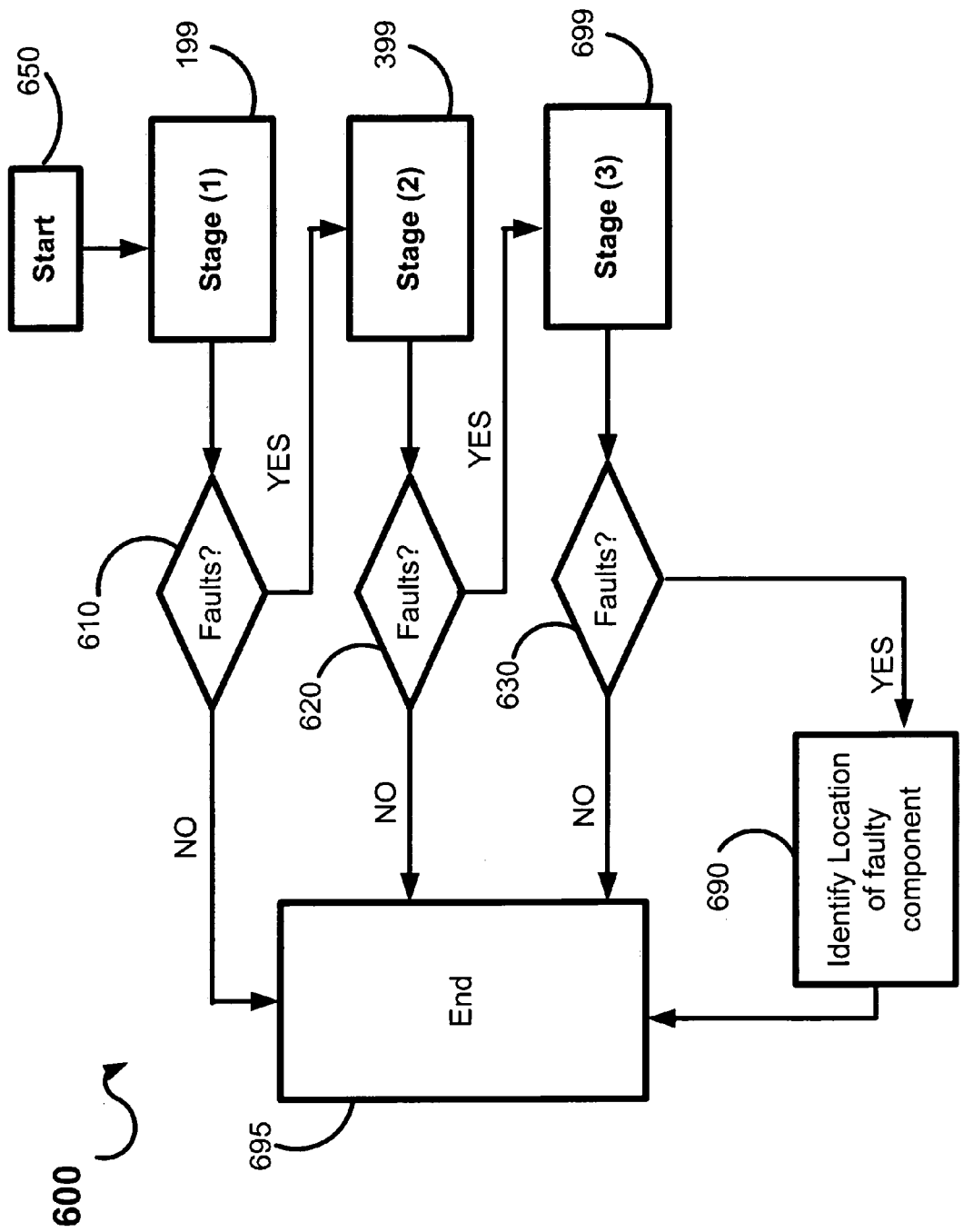
FIG. 6 is a diagram illustrating a multi-stage method for detecting a faulty component location along an optical path through an optical fiber in an optical network in accordance with a second embodiment of the present invention.

FIG. 6 shows a diagram illustrating a multi-stage method 600 for detecting a faulty component location along an optical path through an optical fiber in an optical network in accordance with the second embodiment of the present invention. Upon start up (block 650), procedure 600 performs the first-stage fault detection procedure (block 199) as described earlier with regard to the first embodiment of the invention and FIGS. 2 and 3, and determines whether or not a faulty detection point exists along the optical path through the optical fiber in the optical network.

If a fault is not detected (Exit "NO" from block 610), finishing the procedure 600 (block 695). If a fault is detected (Exit "YES" from block 610), the procedure 600 performs the second-stage fault detection (block 399). The second-stage fault detection determines whether or not a faulty detection point or a faulty component is detected along the optical path. The second-stage fault detection procedure 399 has been described in detail with regard to FIGS. 4 and 5 above.

If a faulty detection point or a faulty component in the second stage is detected (Exit "YES" from block 620), procedure 600 identifies possible locations of the faulty detection point and/or the faulty component and goes to a third-stage fault detection procedure (block 699) for identifying the fault location more accurately. If the fault in the second stage is not detected (Exit "NO" from block 620), finishing the procedure 600 (block 695).

If the fault in the third stage is not detected (Exit "NO" from block 630), finishing the procedure 600 (block 695). If the fault in the third stage is detected (Exit "YES" from block 630), the procedure 600 performs the third-stage fault detection determination (block 699). The third-stage fault detection (block 699) determines a location of a faulty detection point or a faulty component as will be described in more detail with reference to FIGS. 7 and 8 below.

Figure 7:
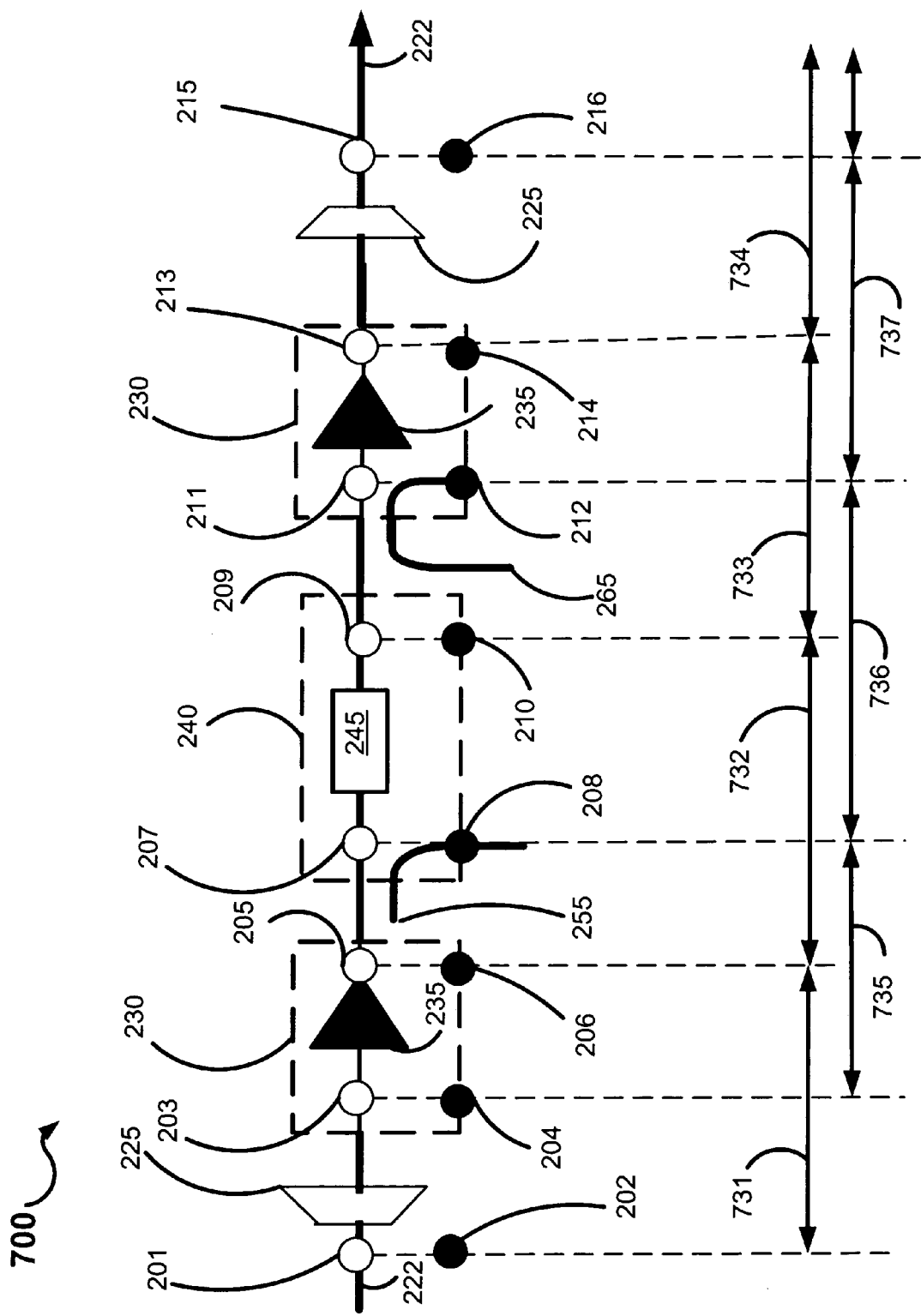
FIG. 7 is a diagram illustrating an apparatus for implementing a third-stage fault detection procedure of the method of FIG. 6.

FIG. 7 shows an apparatus 700 for implementing the third-stage fault detection procedure 699 of the method of FIG. 6. The apparatus 700 is similar to the apparatus 200 of FIG. 2 and apparatus 400 of FIG. 4, and similar elements on all figures are designated by same reference numerals. The apparatus 700 comprises a plurality of detection points 201 to 216 along the optical path through the optical fiber 222 in the optical network, the optical fiber 222 carrying a plurality of individual wavelengths 255 and 265. The optical fiber 222 traverses various optical components, including optical software controllers (OSC) 225, optical equipment 230 having optical amplifiers 235, a ROADM (Reconfigurable optical add/drop multiplexer) 240 having a blocker 245. The apparatus 700 provides for measuring a loss of a wavelength power between a local detection point and its non-adjacent detection point that is represented by double arrowed lines designated with reference numerals 731 to 737 in FIG. 7, wherein 736 represents measuring the loss of the wavelength power for the individual wavelength 255 between the local detection point 208 and the non-adjacent local detection point 212, 737 represents measuring the loss of the wavelength power of the individual wavelength 265 between the local detection point 212 and the non-adjacent local detection point 216, and so on.

Figure 8:
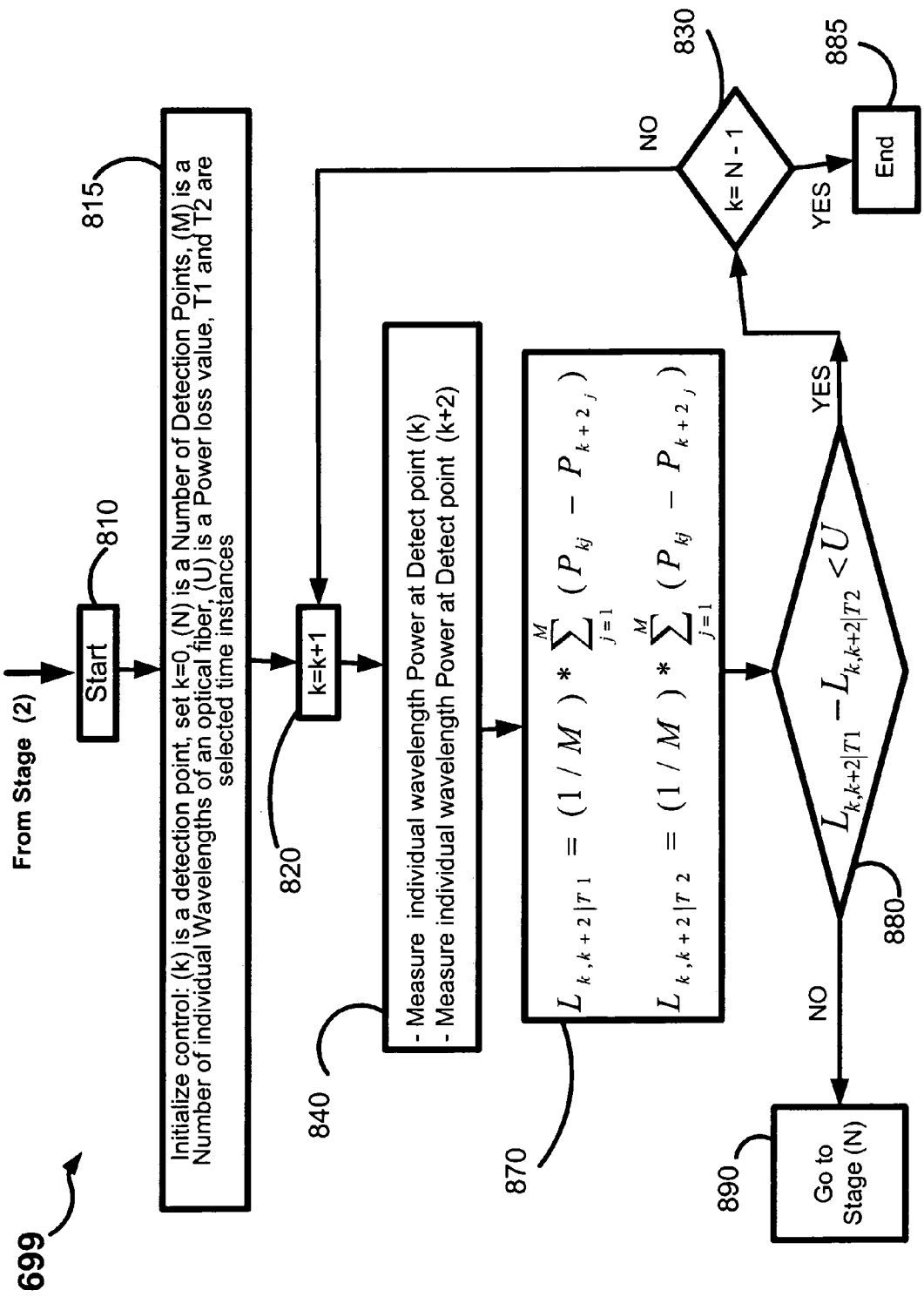
FIG. 8 is a flow chart diagram illustrating the steps of the third-stage fault detection procedure of the method of FIG. 6.

FIG. 8 shows a flow chart diagram 699 illustrating the third-stage detection procedure 699 of the method of FIG. 6 implemented with the aid of the apparatus of FIG. 7. Upon start up (block 810), procedure 699 initializes control (block 815) by setting up a number of detection points (N) and k=0, a number of wavelengths (M) of the optical fiber 222 of FIG. 7, a pre-determined power value (U), and time instances (T1) and (T2) such that T2>T1. The pre-determined power value (U) is based on optical network operation and service management requirements. The value (U) is of the order of magnitude of the measurement equipment tolerance. Conveniently, the time (T1) may represent the first day of the operation of a component deployed in the optical network, and the time (T2) may represents an instant of time which is later than T1 by a predetermined interval of time Δ, e.g. by about one day, or about one-month; or about one week, or about one hour, or about one minute or about a second later. The value of Δ will depend on the particulars of the network configuration and exploitation. Alternatively, it is possible to select T2 as a current time, and T2−T1=Δ which means that T1 happens earlier than T2 by the time interval Δ Yet alternatively, the loss of the total wavelength power may be averaged over a predetermined period of time, e.g. each of the respective ($L_{k,k+2}|_{T1}$) values may be averaged over a time interval ΔT1 preceding T1, the $L_{k,k+2}|_{T1}$ is given by the following formula:

$$L_{k,k+2}|_{T1} = (1/M) * \sum_{j=1}^{M} (P_{k_j} - P_{k+2_j}),  \quad (4)$$

where $P_{k_j}$ is a wavelength power of the $j^{th}$ wavelength of the optical fiber at the local detection point (k) and $P_{k+2_j}$ is the $j^{th}$ wavelength power at the non-adjacent detection point (k+2), and each of the respective ($L_{k,k+2}|_{T2}$) values may be averaged over a time interval ΔT2 preceding T2, wherein ΔT1 and ΔT2 may be selected as required, the $L_{k,k+1}|_{T2}$ is given by the following formula:

$$L_{k,k+2}|_{T2} = (1/M) * \sum_{j=1}^{M} (P_{k_j} - P_{k+2_j}), \quad (5)$$

The procedure 699 starts at a local detection point (k) (block 820) for measuring the total wavelength power (blocks 840) at the local detection point (k) and its non-adjacent detection point (k+2), respectively. The procedure 699 determines the loss of the total wavelength power of the (M) wavelengths at the time (T1) and at the time (T2) (block 870). The procedure 699 further compares the difference between the loss of the total wavelengths power at the time (T1) and at the time (T2) with the pre-determined value (U) (block 880). If the difference is greater than the value (U) (Exit "NO" from block 880), the procedure 699 concludes that a faulty component may exist, and goes to an N-stage fault detection procedure (block 890) for further determining the location of the faulty component. If the difference between the losses of the total wavelengths power at the time (T1) and at the time (T2) is less than the pre-determined value (U), the procedure 699 concludes that there is no fault (Exit "YES" from block 880), followed by finishing the procedure 699 (block 885). The procedure 699 repeats the fault detection steps for each of the (N) detection points (a loop formed by "YES exit from block 880, exit "NO" from block 830, and then to block 820) and when all (N) detection points (block 830) are tested (Exit "YES" from block 830), finishing the procedure 699 (block 885).

Figure 9:
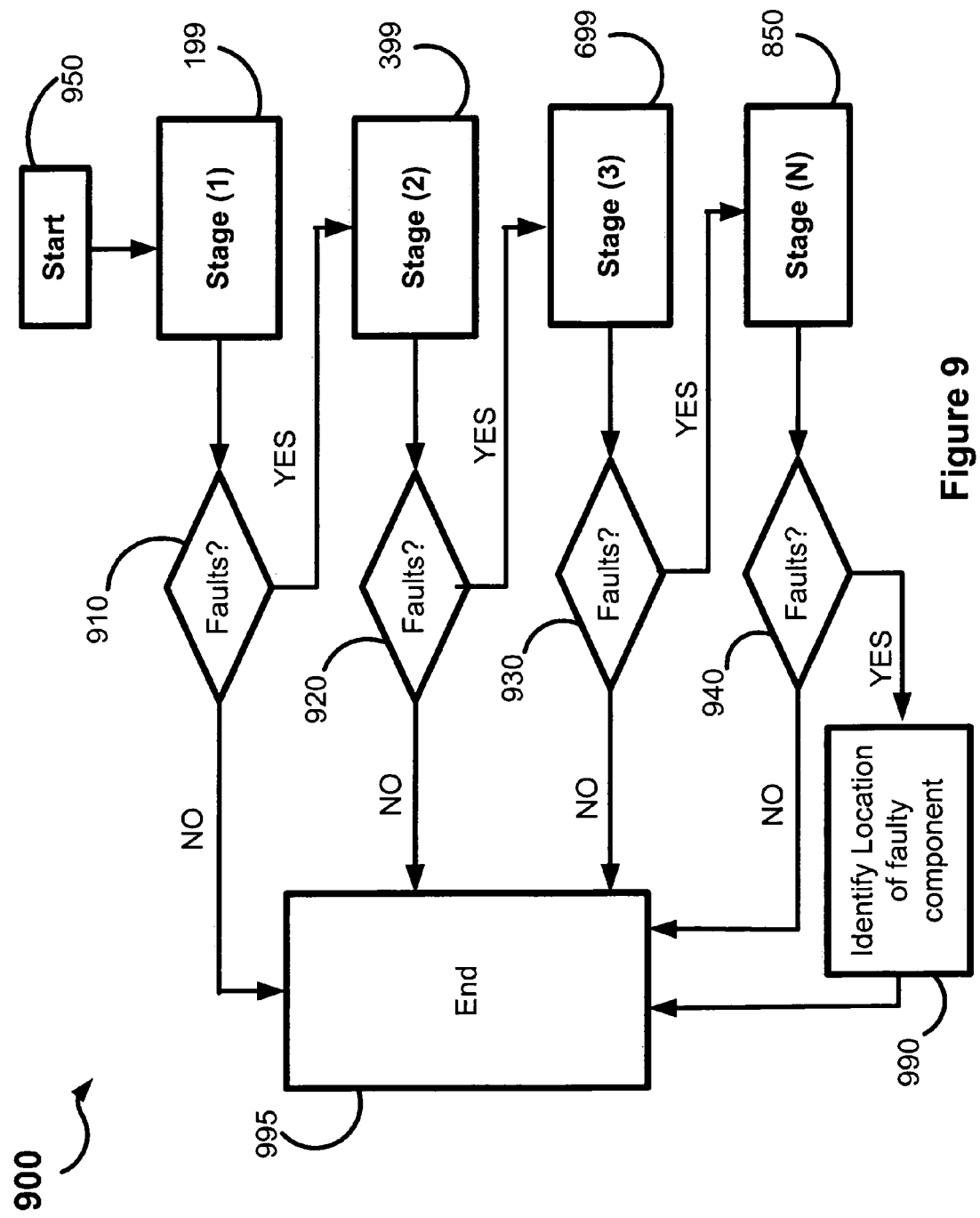
FIG. 9 is a diagram illustrating a multi-stage method for detecting a faulty component location along an optical path through an optical fiber in an optical network in accordance with a third embodiment of the present invention.

FIG. 9 shows a diagram illustrating a multi-stage method 900 for detecting a faulty component location along an optical path through an optical fiber in an optical network in accordance with the third embodiment of the present invention. Upon start up (block 950), procedure 900 performs the first-stage fault detection procedure (block 199) as described earlier with regard to the first embodiment of the invention and FIGS. 2 and 3, and determines whether or not a faulty detection point exists along the optical path through the optical fiber in the optical network.

If a fault is not detected (Exit "NO" from block 910), finishing the procedure 900 (block 995). If a fault is detected (Exit "YES" from block 910), the procedure 900 performs the second-stage fault detection (block 399). The second-stage fault detection determines whether or not a faulty detection point or a faulty component is detected along the optical path. The second-stage fault detection procedure has been described in detail with regard to FIGS. 4 and 5 above.

If a faulty detection point or a faulty component in the second stage is detected (Exit "YES" from block 920), procedure 900 identifies possible locations of the faulty detection point and/or the faulty component and goes to a third-stage fault detection procedure (block 699) for identifying the fault location more accurately. If the fault in the second stage is not detected (Exit "NO" from block 920), finishing the procedure 900 (block 995); The third-stage fault detection procedure 699 has been described in detail with regard to FIGS. 7 and 8.

If the fault in the third stage is not detected (Exit "NO" from block 930), finishing the procedure 900 (block 995). If a faulty detection point or a faulty component in the third stage is detected (Exit "YES" from block 940), procedure 900 identifies possible locations of the faulty detection point and/or the faulty component and goes to an N-stage fault detection procedure (block 850) for identifying the fault location more accurately.

If the fault in the N-stage is not detected (Exit "NO" from block 940), finishing the procedure 900 (block 995). The N-stage fault detection (block 850) determines a location of a faulty detection point or a faulty component as will be described in more detail with reference to FIG. 10 below.

Figure 10:
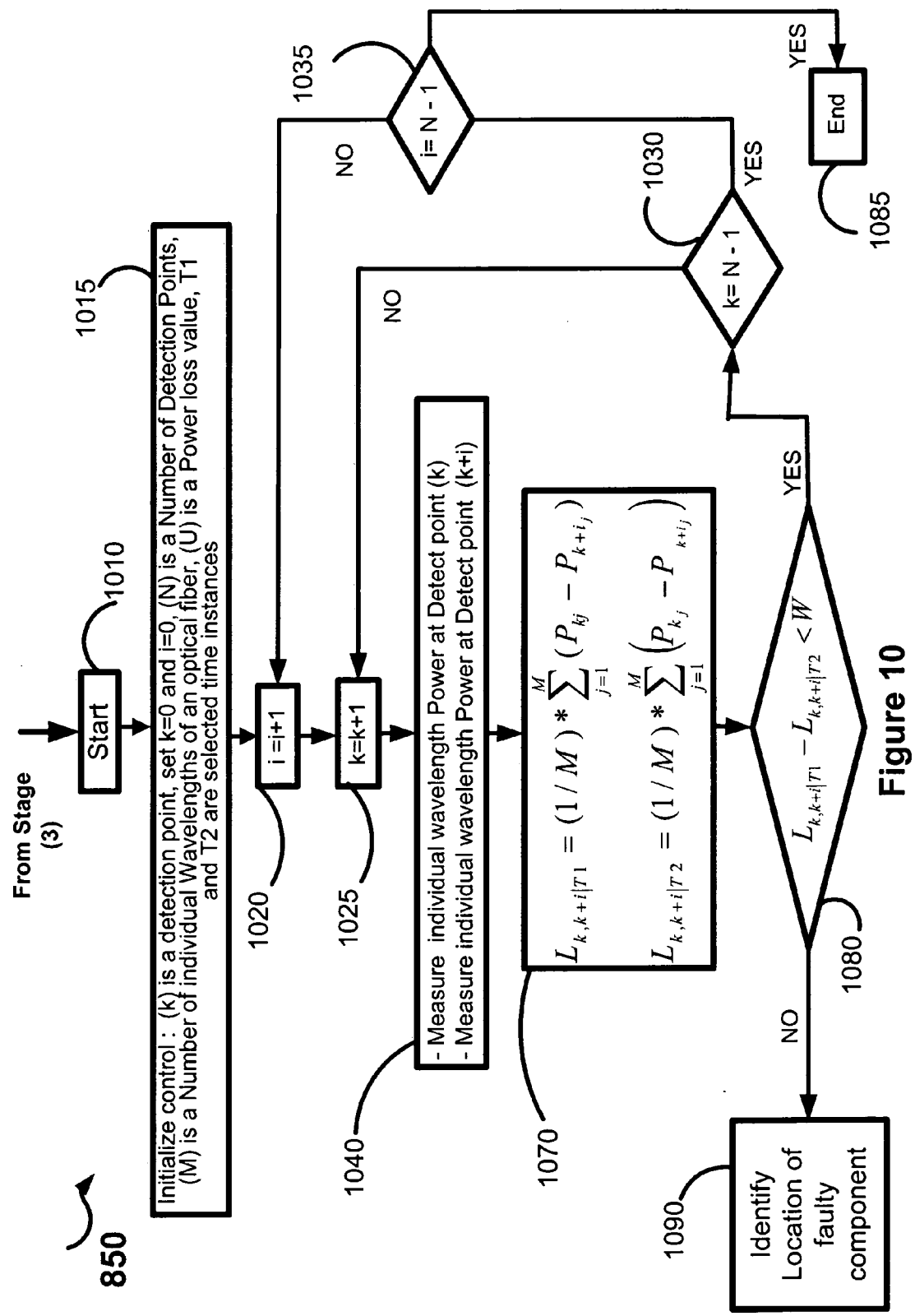
FIG. 10 is a flow chart diagram illustrating a N-stage fault detection procedure of the method of FIG. 9.

FIG. 10 shows a flow chart diagram 850 illustrating the N-stage detection procedure 850 of the method of FIG. 9. Upon start up (block 1010), procedure 850 initializes control (block 1015) by setting up a number of detection points (N) and k=0, a number of wavelengths (M) of the optical fiber, a pre-determined power value (W), and time instances (T1) and (T2) such that T2>T1. The predetermined power value (W) is based on optical network operation and service management requirements. The value (W) is of the order of magnitude of the measurement equipment tolerance. Conveniently, the time (T1) may represent the first day of the operation of a component deployed in the optical network, and the time (T2) may represents an instant of time which is later than T1 by a predetermined interval of time Δ, e.g. by about one day, or about one month, or about one week, or about one hour, or about one minute or about a second later. The value of Δ will depend on the particulars of the network configuration and exploitation. Alternatively, it is possible to select T2 as a current time, and T2−T1=Δ which means that T1 happens earlier than T2 by the time interval Δ Yet alternatively, the loss of the total wavelength power may be averaged over a predetermined period of time, e.g. each of the respective ($L_{k,k+i}|_{T1}$) values may be averaged over a time interval ΔT1 preceding T1, the $L_{k,k+i}|_{T1}$ is given by the following formula:

$$L_{k,k+i}|_{T1} = (1/M) * \sum_{j=1}^{M} (P_{k_j} - P_{k+i_j}), \quad (6)$$

where $P_{k_j}$ is a wavelength power of the $j^{th}$ wavelength of the optical fiber at the local detection point (k) and $P_{k+i_j}$ is the $j^{th}$ wavelength power at the (N) detection point (k+i), i=1, 2, ... N−1, and each of the respective ($L_{k,k+i}|_{T2}$) values may be averaged over a time interval ΔT2 preceding T2, wherein ΔT1 and ΔT2 may be selected as required, the $L_{k,k+i}|_{T2}$ is given by the following formula:

$$L_{k,k+i}|_{T2} = (1/M) * \sum_{j=1}^{M} (P_{k_j} - P_{k+i_j}), \quad (7)$$

The procedure 850 starts at a local detection point (k) (block 1025) and another adjacent or non-adjacent detection point (i) (block 1020) for measuring the total wavelength power (blocks 1040) at the local detection point (k) and another adjacent or non-adjacent detection point (k+i), respectively. The procedure 850 determines the loss of the total wavelength power of the (M) wavelengths at the time (T1) and at the time (T2) (block 1070). The procedure 850 further compares the difference between the loss of the total wavelengths power at the time (T1) and at the time (T2) with the pre-determined value (W) (block 1080).

If the difference is greater than the value (W) (Exit "NO" from block 1080), the procedure 850 determines the location of the faulty component (block 1090). If the difference between the losses of the total wavelengths power at the time (T1) and at the time (T2) is less than the pre-determined value (W), the procedure 850 concludes that there is no fault (Exit "YES" from block 1080), followed by finishing the procedure 850 (block 1085). The procedure 850 repeats the fault detection steps for each of the (N) detection points (a loop formed by "YES exit from block 1080, exit "NO" from block 1030, and then to block 1025) and when all (N) detection points (block 1030) are tested (Exit "YES" from block 1030), the procedure 850 repeats the fault detection steps for all the adjacent or non-adjacent detection points (a loop formed by "YES exit from block 1080, exit "YES" from block 1030, and then to block 1035). When all (N−1) adjacent or non-adjacent detection points (block 1035) are tested (Exit "YES" from block 1035), finishing the procedure 850 (block 1085).

Figure 11:
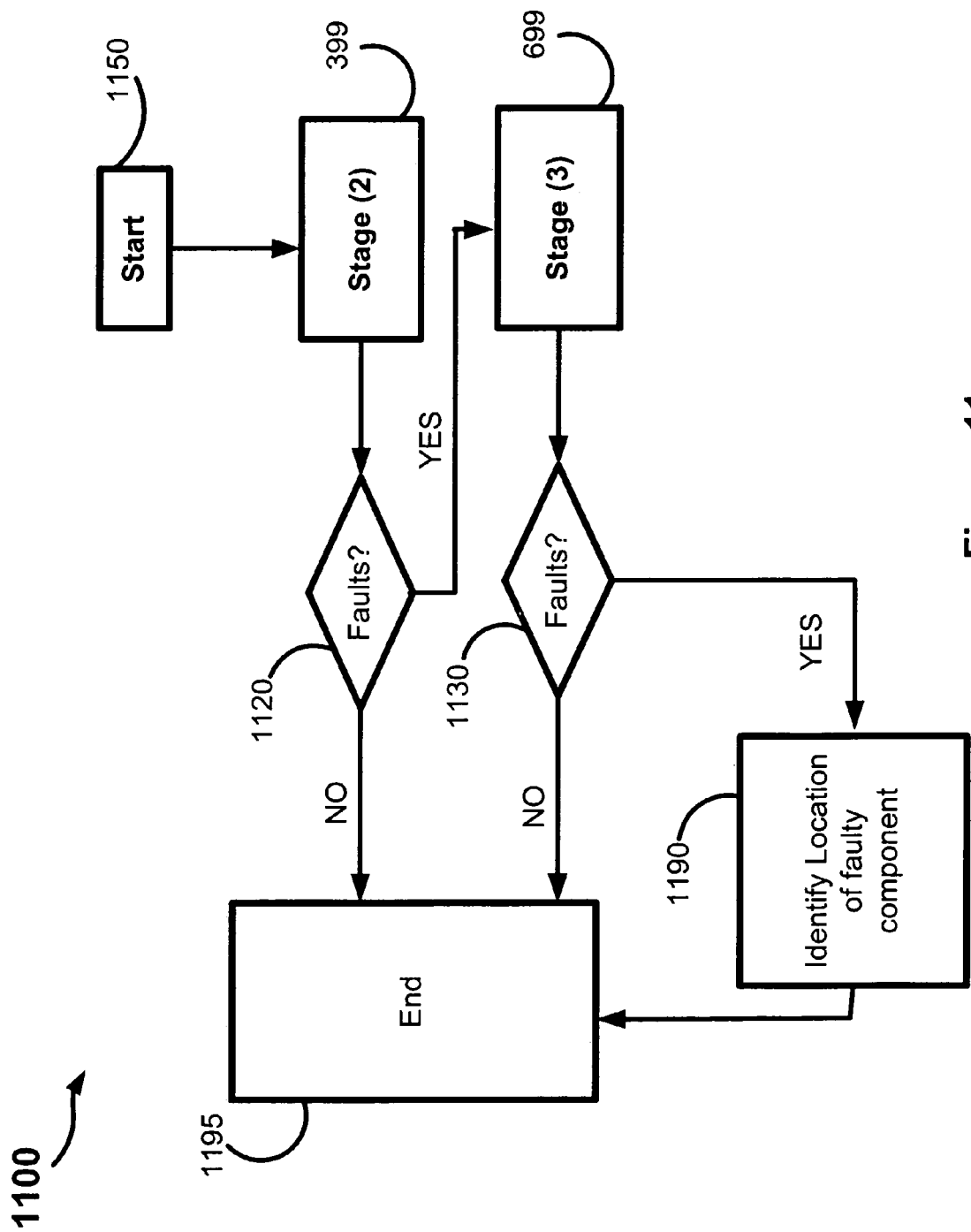
FIG. 11 is a diagram illustrating a multi-stage method for detecting a faulty component location along an optical path through an optical fiber in an optical network in accordance with a fourth embodiment of the present invention.

FIG. 11 shows a diagram illustrating a multi-stage method 1100 for detecting a faulty component location along an optical path through an optical fiber in an optical network in accordance with the fourth embodiment of the present invention. Upon start up (block 1150), procedure 1100 performs the second-stage fault detection procedure (block 399) as described earlier with regard to the first embodiment of the invention and FIGS. 4 and 5, and determines whether or not a faulty detection point exists along the optical path through the optical fiber in the optical network.

If a fault is not detected (Exit "NO" from block 1120), finishing the procedure 1100 (block 1195). If a fault is detected (Exit "YES" from block 1120), the procedure 1100 performs the third-stage fault detection (block 699). The third-stage fault detection determines whether or not a faulty detection point or a faulty component is detected along the optical path (block 1190). The third-stage fault detection procedure has been described in detail with regard to FIGS. 7 and 8 above.

If the fault in the third stage is not detected (Exit "NO" from block 1130), finishing the procedure 1100 (block 1195). If the fault in the third stage is detected (Exit "YES" from block 1130), the procedure 1100 performs the third-stage fault detection determination (block 699). The third-stage fault detection (block 699) determines a location of a faulty detection point or a faulty component as described above.

Figure 12:
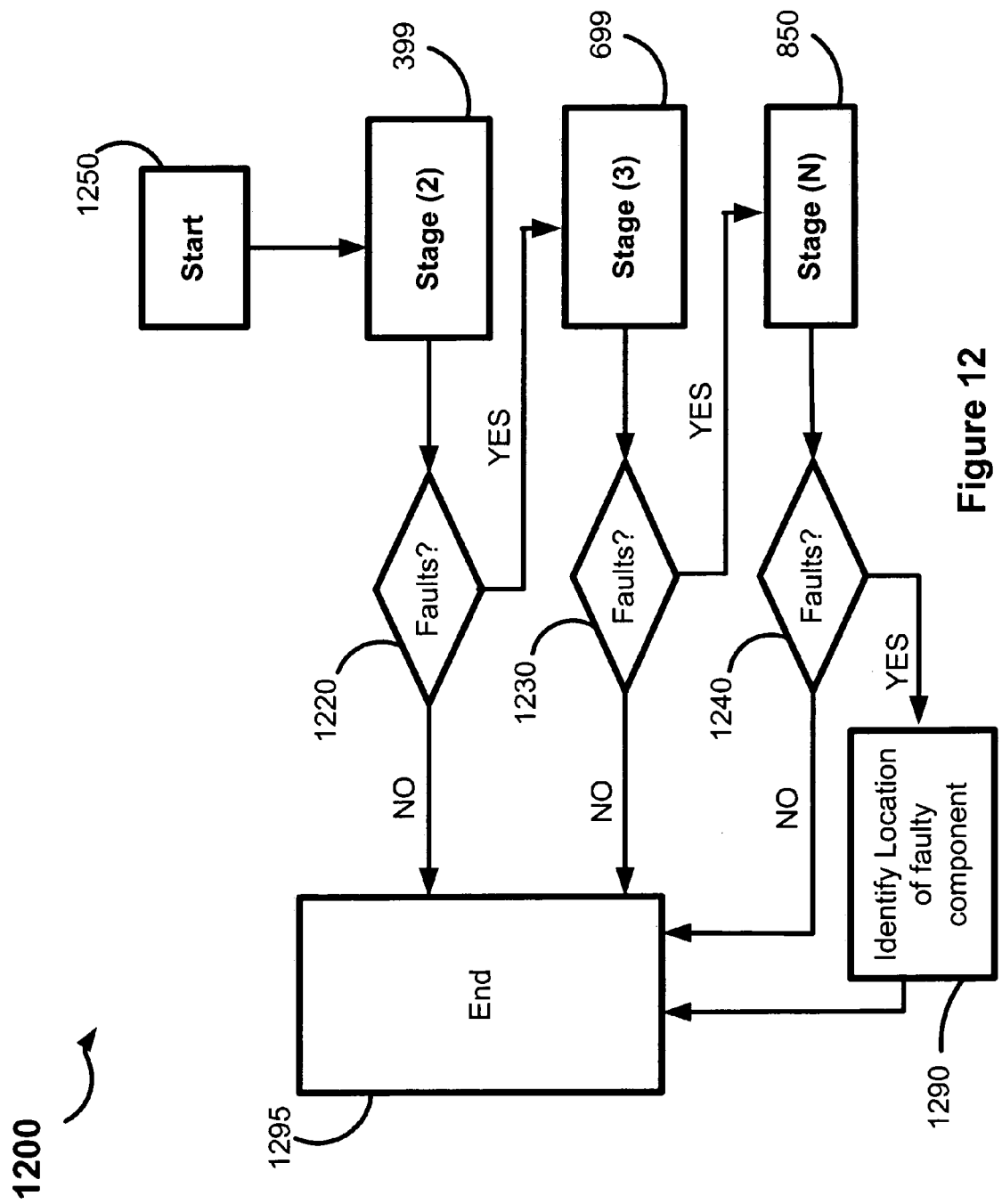
FIG. 12 is a diagram illustrating a multi-stage method for detecting a faulty component location along an optical path through an optical fiber in an optical network in accordance with a fifth embodiment of the present invention.

FIG. 12 shows a diagram illustrating a multi-stage method 1200 for detecting a faulty component location along an optical path through an optical fiber in an optical network in accordance with the fifth embodiment of the present invention. Upon start up (block 1250), procedure 1200 performs the second-stage fault detection (block 399). The second-stage fault detection determines whether or not a faulty detection point or a faulty component is detected along the optical path. The second-stage fault detection procedure has been described in detail with regard to FIGS. 4 and 5.

If a faulty detection point or a faulty component in the second stage is detected (Exit "YES" from block 1220), procedure 1200 identifies possible locations of the faulty detection point and/or the faulty component and goes to a third-stage fault detection procedure (block 699) for identifying the fault location more accurately. If the fault in the second stage is not detected (Exit "NO" from block 1220), finishing the procedure 1200 (block 1295). The third-stage fault detection procedure has been described in detail with regard to FIGS. 7 and 8 above.

If the fault in the third stage is not detected (Exit "NO" from block 1230), finishing the procedure 1200 (block 1295). If a faulty detection point or a faulty component in the third stage is detected (Exit "YES" from block 1240), procedure 1200 identifies possible locations of the faulty detection point and/or the faulty component and goes to an N-stage fault detection procedure (block-850) for identifying the fault location more accurately.

If the fault in the N-stage is not detected (Exit "NO" from block 1240), finishing the procedure 1200 (block 1295). The N-stage fault detection (block 850) determines the location of the faulty detection point or the faulty component as described with regard to FIG. 10 above.

Thus, the present invention provides methods and apparatus for detecting a faulty component location along an optical path through an optical fiber in an optical network.

It will be apparent to those with skill in the art that modifications to the above embodiments can occur without deviating from the scope of the present invention. Accordingly, the disclosure and descriptions herein are intended to be illustrative, but not limiting of the scope of the invention which is set forth in the following claims.

What is claimed is:

1. A method for determining a faulty component location along an optical path through an optical fiber in an optical network, the optical fiber carrying a plurality of individual wavelengths, the method comprising the steps of:
   (a) measuring a total power of the optical fiber at a plurality of local detection points along the optical path;
   (b) measuring a total wavelength power of said individual wavelengths at each of said local detection points;
   (c) if a discrepancy between the total power of the optical fiber in step (a) and the total wavelength power in step (b) exceeding an accuracy of measurements is detected at a local detection point, determining that a faulty detection point or a component may exist along the optical path;
   (d) measuring a loss of a total wavelength power between a local detection point and a detection point adjacent to said local detection point; and
   (e) for each pair of the local and adjacent detection points, if the loss of the total wavelength power in step (d) is greater than a reference loss value for the respective pair, determining one or more of the following:
      a fault occurs at the local detection point,
      a fault occurs at the adjacent detection point, and
      a faulty component is located between the local detection point and the adjacent detection point to said local detection point.

2. The method as described in claim 1, wherein the individual wavelengths are modulated by a low frequency dither tone for identification purposes and performance monitoring in the optical network, and wherein the step (a) is performed before modulating the wavelengths with the dither tones, and the steps (b) and (d) are performed after modulating the wavelengths with the dither tones.

3. The method as described in claim 1, wherein the step (c) comprises:
   (p) computing a difference between the total power of the optical fiber ($P_{total}$) and the total wavelength power ($P_S$) of the individual wavelengths of said optical fiber, wherein the difference (Difference-in-Power) is given by the following formula:

$$\text{Difference-in-Power} = P_{total} - P_S, \text{ and}$$

$$P_S = \sum_{j=1}^{M} P_j,$$

wherein $P_j$ is an individual wavelength power for a $j^{th}$ wavelength, and M is a number of wavelengths of said optical fiber; and (q) if the difference in step (p) is greater than a predetermined value (X) and less than a pre-determined value (Y), determining that a faulty detection point or a component may exist along the optical path.

4. The method as described in claim 3, wherein the pre-determined value (X) is about "3 dB", and the pre-determined value (Y) is about "−1 dB".

5. The method as described in claim 1, wherein the step (d) comprises determining the loss of the total wavelength power as follows:

$$L_{k,k+1} = (1/M) * \sum_{j=1}^{M} (P_{k_j} - P_{k+1_j})$$

wherein $P_{k_j}$ is a power of a $j^{th}$ wavelength at the local detection point (k), $P_{k+1_j}$ is a power of the $j^{th}$ wavelength at the adjacent detection point (k+1), and M is a number of wavelengths of said optical fiber.

6. The method as described in claim 5, wherein the step (e) comprises:
(r) computing the loss of the total wavelength power at a pre-determined time (T1), ($L_{k,k+1}|_{T1}$);
(s) setting the respective reference loss value to be equal to ($|L_{k,k+1}|_{T1}|-V$), wherein (V) equals to a pre-determined value;
(t) computing the total wavelength power loss at another pre-determined time (T2>T1), ($L_{k,k+1}|_{T2}$); and
(u) if the $|L_{k,k+1}|_{T2}|$ in step (t) is less than the respective reference loss value ($|L_{k,k+1}|_{T1}|-V$) in step (s), determining that a faulty component is located between the local detection point and the adjacent detection point.

7. The method as described in claim 6, wherein the pre-determined value (V) is about 1 dB.

8. The method as described in claim 6, wherein T2 is a current instance of time, and T2−T1=Δ, wherein Δ is one of the following:
(a) about 1 month;
(b) about 1 week;
(c) about 1 day;
(d) about 1 hour;
(e) about 1 minute; or
(f) about 1 second.

9. The method as described in claim 6, wherein the step (r) comprises averaging each of the respective ($L_{k,k+1}|_{T1}$) values over a time interval ΔT1 preceding T1, and the step (t) comprises averaging each of the respective ($L_{k,k+1}|_{T2}$) values over a time interval ΔT2 preceding T2.

10. The method as described in claim 1, wherein the step (d) comprises determining the loss of the total wavelength power as follows:

$$L_{k,k+1} = (1/M) * \left( \sum_{j=1}^{M} P_{k_j} - \sum_{j=1}^{M} P_{k+1_j} \right)$$

wherein $P_{k_j}$ is a power of a $j^{th}$ wavelength at the local detection point (k), $P_{k+1_j}$ is a power of the $j^{th}$ wavelength at the adjacent detection point (k+1), and M is a number of wavelengths of said optical fiber.

11. The method as described in claim 6, wherein the step (e) comprises:
(r) computing the loss of the total wavelength power at a pre-determined time (T1), ($L_{k,k+1}|_{T1}$);
(s) setting the respective reference loss value to be equal to ($|L_{k,k+1}|_{T1}|-V$), wherein (V) equals to a pre-determined value;
(t) computing the total wavelength power loss at another pre-determined time (T2>T1), ($L_{k,k+1}|_{T2}$); and
(u) if the $|L_{k,k+1}|_{T2}|$ in step (t) is less than the respective reference loss value ($|L_{k,k+1}|_{T1}|-V$) in step (s), determining that a faulty component is located between the local detection point and the adjacent detection point.

12. The method as described in claim 11, wherein the pre-determined value (V) is about 1 dB.

13. The method as described in claim 11, wherein T2 is a current instance of time, and T2−T1=Δ, wherein Δ is one of the following:
(a) about 1 month;
(b) about 1 week;
(c) about 1 day;
(d) about 1 hour;
(e) about 1 minute; or
(f) about 1 second.

14. The method as described in claim 11, wherein the step (r) comprises averaging each of the respective ($L_{k,k+1}|_{T1}$) values over a time interval ΔT1 preceding T1, and the step (t) comprises averaging each of the respective ($L_{k,k+1}|_{T2}$) values over a time interval ΔT2 preceding T2.

15. The method as described in claim 1, further comprising:
(f) measuring a loss of a total wavelength power between a local detection point and a detection point which is non-adjacent to said local detection point; and
(g) for each pair of the local and non-adjacent detection points, if the loss of the total wavelength power in step (f) is less than a reference loss value for the respective pair, determining one or more of the following:
a faulty component is located between the local detection point and the adjacent detection point, and
a faulty component is located between the local detection point and the non-adjacent detection point.

16. The method as described in claim 15, wherein the step (f) comprises determining the loss of the total wavelength power as follows:

$$L_{k,k+i} = (1/M) * \sum_{j=1}^{M} (P_{k_j} - P_{k+i_j}),$$

wherein $P_{k_j}$ is a power of a $j^{th}$ wavelength at the local detection point (k), $P_{k+i_j}$ is a power of the $j^{th}$ wavelength at the adjacent detection point (k+i), i=1, 2, . . . , N−1 and N is the total number of detection points along the optical path, and M is a number of wavelengths of said optical fiber.

17. The method as described in claim 16, wherein the step (g) comprises:
(r) computing the loss of the total wavelength power at a pre-determined time (T1), ($L_{k,k+i}|_{T1}$);
(s) setting the respective reference loss value to be equal to ($|L_{k,k+i}|_{T1}|-W$), wherein (W) equals to a pre-determined value;
(t) computing the total wavelength power loss at another pre-determined time (T2>T1), ($L_{k,k+i}|_{T2}$); and (u) if the |L_{k,k+i}|_{T2}| in step (t) is less than the respective reference loss value (|L_{k,k+i}|_{T1}|−W) in step (s), determining that a faulty component is located between the local detection point and the non-adjacent detection point.

18. The method as described in claim 17, wherein the pre-determined value (W) is about 1 dB.

19. The method as described in claim 17, wherein T2 is a current instance of time, and T2−T1=Δ, wherein Δ is one of the following:
  (a) about 1 month;
  (b) about 1 week;
  (c) about 1 day;
  (d) about 1 hour;
  (e) about 1 minute; or
  (f) about 1 second.

20. The method as described in claim 17, wherein the step (r) comprises averaging each of the respective (L_{k,k+i}|_{T1}) values over a time interval ΔT1 preceding T1, and the step (t) comprises averaging each of the respective (L_{k,k+i}|_{T2}) values over a time interval ΔT2 preceding T2, and i=1, 2, . . . , N−1 and N is the total number of detection points along the optical path.

21. The method as described in claim 15, wherein the step (f) comprises determining the loss of the total wavelength power as follows:

$$L_{k,k+i} = (1/M) * \left( \sum_{j=1}^{M} P_{k_j} - \sum_{j=1}^{M} P_{k+i_j} \right),$$

wherein $P_{k_j}$ is a power of a $j^{th}$ wavelength at the local detection point (k), $P_{k+i_j}$ is a power of the $j^{th}$ wavelength at the adjacent detection point (k+i), i=1, 2, . . . , N−1 and N is the total number of detection points along the optical path, and M is a number of wavelengths of said optical fiber.

22. The method as described in claim 21, wherein the step (g) comprises:
  (r) computing the loss of the total wavelength power at a pre-determined time (T1), (L_{k,k+i}|_{T1});
  (s) setting the respective reference loss value to be equal to (|L_{k,k+i}|_{T1}|−W), wherein (W) equals to a pre-determined value;
  (t) computing the total wavelength power loss at another pre-determined time (T2>T1), (L_{k,k+i}|_{T2}); and
  (u) if the |L_{k,k+i}|_{T2}| in step (t) is less than the respective reference loss value (|L_{k,k+i}|_{T1}|−W) in step (s), determining that a faulty component is located between the local detection point and the non-adjacent detection point.

23. The method as described in claim 22, wherein the pre-determined value (W) is about 1 dB.

24. The method as described in claim 22, wherein T2 is a current instance of time, and T2−T1=Δ, wherein Δ is one of the following:
  (a) about 1 month;
  (b) about 1 week;
  (c) about 1 day;
  (d) about 1 hour;
  (e) about 1 minute; or
  (f) about 1 second.

25. The method as described in claim 22, wherein the step (r) comprises averaging each of the respective (L_{k,k+i}|_{T1}) values over a time interval ΔT1 preceding T1, and the step (t) comprises averaging each of the respective (L_{k,k+i}|_{T2}) values over a time interval ΔT2 preceding T2, and i=1, 2, . . . , N−1 and N is the total number of detection points along the optical path.

26. A method for determining a faulty component location along an optical path through an optical fiber in an optical network, the optical fiber carrying a plurality of individual wavelengths, the method comprising the steps of:
  (j) measuring a loss of a total wavelength power between a local detection point and a detection point adjacent to said local detection point;
  (k) for each pair of the local and adjacent detection points, if the loss of the total wavelength power in step (j) is less than a reference loss value for the respective pair, determining one or more of the following:
    a fault occurs at the local detection point,
    a fault occurs at the adjacent detection point, and
    a faulty component is located between the local detection point and the adjacent detection point;
  (l) measuring a loss of a total wavelength power between the local detection point and a detection point, which is non-adjacent to, said local detection point;
  (m) for each pair of the local and non-adjacent detection points, if the loss of the total wavelengths power in step (l) is less than a reference loss value for the respective pair, determining one or more of the following:
    a fault occurs at the non-adjacent detection point,
    a faulty component is located between the local detection point and the adjacent detection point, and
    a faulty component is located between the local detection point and the non-adjacent detection point.

27. The method as described in claim 26, wherein the individual wavelengths are modulated by a low frequency dither tone for identification purposes and performance monitoring in the optical network, and wherein the steps (j) and (l) are performed after modulating the wavelengths with the dither tones.

28. The method as described in claim 26, wherein the step (j) comprises determining the loss of the total wavelength power as follows:

$$L_{k,k+1} = (1/M) * \sum_{j=1}^{M} (P_{k_j} - P_{k+1_j}),$$

wherein $P_{k_j}$ is a power of a $j^{th}$ wavelength at the local detection point (k), $P_{k+1_j}$ is a power of the $j^{th}$ wavelength at the adjacent detection point (k+1), and M is a number of wavelengths of said optical fiber.

29. The method as described in claim 28, wherein the step (k) comprises:
  (r) computing the loss of the total wavelength power at a pre-determined time (T1), (L_{k,k+1}|_{T1});
  (s) setting the respective reference loss value to be equal to (|L_{k,k+1}|_{T1}|−V), wherein (V) equals to a pre-determined value;
  (t) computing the total wavelength power loss at another pre-determined time (T2>T1), (L_{k,k+1}|_{T2}); and
  (u) if the |L_{k,k+1}|_{T2}| in step (t) is less than the respective reference loss value (|L_{k,k+1}|_{T1}|−V) in step (s), determining that a faulty component is located between the local detection point and the adjacent detection point.

30. The method as described in claim 29, wherein the pre-determined value (V) is about 1 dB.

31. The method as described in claim 29, wherein T2 is a current instance of time, and T2−T1=Δ, wherein Δ is one of the following:
(a) about 1 month;
(b) about 1 week;
(c) about 1 day;
(d) about 1 hour;
(e) about 1 minute; or
(f) about 1 second.

32. The method as described in claim 29, wherein the step (r) comprises averaging each of the respective $(L_{k,k+1}|_{T1})$ values over a time interval ΔT1 preceding T1, and the step (t) comprises averaging each of the respective $(L_{k,k+1}|_{T2})$ values over a time interval ΔT2 preceding T2.

33. The method as described in claim 26, wherein the step (j) comprises determining the loss of the total wavelength power as follows:

$$L_{k,k+1} = (1/M) * \left( \sum_{j=1}^{M} P_{k_j} - \sum_{j=1}^{M} P_{k+1_j} \right),$$

wherein $P_{k_j}$ is a power of a $j^{th}$ wavelength at the local detection point (k), $P_{k+1_j}$ is a power of the $j^{th}$ wavelength at the adjacent detection point (k+1), and M is a number of wavelengths of said optical fiber.

34. The method as described in claim 33, wherein the step (k) comprises:
(r) computing the loss of the total wavelength power at a pre-determined time (T1), $(L_{k,k+1}|_{T1})$;
(s) setting the respective reference loss value to be equal to $(|L_{k,k+1}|_{T1}|-V)$, wherein (V) equals to a pre-determined value;
(t) computing the total wavelength power loss at another pre-determined time (T2>T1), $(L_{k,k+1}|_{T2})$; and
(u) if the $|L_{k,k+1}|_{T2}|$ in step (t) is less than the respective reference loss value $(|L_{k,k+1}|_{T1}|-V)$ in step (s), determining that a faulty component is located between the local detection point and the adjacent detection point.

35. The method as described in claim 34, wherein the pre-determined value (V) is about 1 dB.

36. The method as described in claim 34, wherein T2 is a current instance of time, and T2−T1=Δ, wherein Δ is one of the following:
(a) about 1 month;
(b) about 1 week;
(c) about 1 day;
(d) about 1 hour;
(e) about 1 minute; or
(f) about 1 second.

37. The method as described in claim 34, wherein the step (r) comprises averaging each of the respective $(L_{k,k+1}|_{T1})$ values over a time interval ΔT1 preceding T1, and the step (t) comprises averaging each of the respective $(L_{k,k+1}|_{T2})$ values over a time interval ΔT2 preceding T2.

38. The method as described in claim 26, wherein the step (l) comprises determining the loss of the total wavelength power as follows:

$$L_{k,k+i} = (1/M) * \sum_{j=1}^{M} (P_{k_j} - P_{k+i_j}),$$

wherein $P_{k_j}$ is a power of a $j^{th}$ wavelength at the local detection point (k), $P_{k+i_j}$ is a power of the $j^{th}$ wavelength at the adjacent detection point (k+i), i=1, 2, . . . , N−1 and N is the total number of detection points along the optical path, and M is a number of wavelengths of said optical fiber.

39. The method as described in claim 38, wherein the step (m) comprises:
(r) computing the loss of the total wavelength power at a pre-determined time (T1), $(L_{k,k+i}|_{T1})$;
(s) setting the respective reference loss value to be equal to $(|L_{k,k+i}|_{T1}|-W)$, wherein (W) equals to a pre-determined value;
(t) computing the total wavelength power loss at another pre-determined time (T2>T1), $(L_{k,k+i}|_{T2})$; and
(u) if the $|L_{k,k+i}|_{T2}|$ in step (t) is less than the respective reference loss value $(|L_{k,k+i}|_{T1}|-W)$ in step (s), determining that a faulty component is located between the local detection point and the adjacent detection point.

40. The method as described in claim 39, wherein the pre-determined value (W) is about 1 dB.

41. The method as described in claim 39, wherein T2 is a current instance of time, and T2−T1=Δ, wherein Δ is one of the following:
(a) about 1 month;
(b) about 1 week;
(c) about 1 day;
(d) about 1 hour;
(e) about 1 minute; or
(f) about 1 second.

42. The method as described in claim 39, wherein the step (r) comprises averaging each of the respective $(L_{k,k+i}|_{T1})$ values over a time interval ΔT1 preceding T1, and the step (t) comprises averaging each of the respective $(L_{k,k+i}|_{T2})$ values over a time interval ΔT2 preceding T2, and i=1, 2, . . . , N−1 and N is the total number of detection points along the optical path.

43. The method as described in claim 26, wherein the step (l) comprises determining the loss of the total wavelength power as follows:

$$L_{k,k+i} = (1/M) * \left( \sum_{j=1}^{M} P_{k_j} - \sum_{j=1}^{M} P_{k+i_j} \right),$$

wherein $P_{k_j}$ is a power of a $j^{th}$ wavelength at the local detection point (k), $P_{k+i_j}$ is a power of the $j^{th}$ wavelength at the adjacent detection point (k+i), i=1, 2, . . . , N−1 and N is the total number of detection points along the optical path, and M is a number of wavelengths of said optical fiber.

44. The method as described in claim 43, wherein the step (m) comprises:
(r) computing the loss of the total wavelength power at a pre-determined time (T1), $(L_{k,k+i}|_{T1})$;
(s) setting the respective reference loss value to be equal to $(|L_{k,k+i}|_{T1}|-W)$, wherein (W) equals to a pre-determined value;
(t) computing the total wavelength power loss at another pre-determined time (T2>T1), $(L_{k,k+i}|_{T2})$; and
(u) if the $|L_{k,k+i}|_{T2}|$ in step (t) is less than the respective reference loss value $(|L_{k,k+i}|_{T1}|-W)$ in step (s), determining that a faulty component is located between the local detection point and the adjacent detection point.

45. The method as described in claim 44, wherein the pre-determined value (W) is about 1 dB.

46. The method as described in claim 44, wherein T2 is a current instance of time, and T2−T1=Δ, wherein Δ is one of the following:
  (a) about 1 month;
  (b) about 1 week;
  (c) about 1 day;
  (d) about 1 hour;
  (e) about 1 minute; or
  (f) about 1 second.

47. The method as described in claim 44, wherein the step (r) comprises averaging each of the respective $(L_{k,k+i}|_{T1})$ values over a time interval ΔT1 preceding T1, and the step (t) comprises averaging each of the respective $(L_{k,k+i}|_{T2})$ values over a time interval ΔT2 preceding T2, and i=1, 2, ..., N−1 and N is the total number of detection points along the optical path.

48. An apparatus for determining a faulty component location along an optical path through an optical fiber in an optical network, the optical fiber carrying a plurality of individual wavelengths, the apparatus comprising:
  (1) at each of a plurality of local detection points along the optical path, a detector, measuring a total power of the optical fiber;
  (2) at each of said local detection points, a detector, measuring a total wavelength power of said individual wavelengths;
  (3) a comparator, comparing the total power of the optical fiber in step (1) and the total wavelength power in step (2) for each of said local detection points, and generating a message alert signal indicating that a faulty detection point may exist along the optical path, if a discrepancy between the total power of the optical fiber in step (1) and the total wavelength power in step (2) beyond an accuracy of measurements is detected;
  (4) a detector, measuring a loss of a total wavelength power between a local detection point and a detection point adjacent to said local detection point; and
  (5) a comparator, for each pair of the local and adjacent detection points comparing the loss of the total wavelength power with a respective reference loss value for the pair, and if the total wavelength power loss in step (4) is less than the respective reference loss value, generating a message alert signal indicating one or more of the following:
    a fault occurs at the local detection point,
    a fault occurs at the adjacent detection point, and
    a faulty component is located between the local detection point and the adjacent detection point.

49. The apparatus as described in claim 48, further comprising:
  (6) a detector, measuring a loss of a total wavelength power between a local detection point and a detection point which is non-adjacent to said local detection point; and
  (7) a comparator, for each pair of the local and non-adjacent detection points comparing the loss of the total wavelength power with a respective reference loss value for the pair, and if the total wavelength power loss in step (6) is less than the respective reference loss value, generating a message alert signal for one or more of the following:
    a faulty component is located between the local detection point and the adjacent detection point, and
    a faulty component is located between the local detection point and the non-adjacent detection point.

50. A apparatus for determining a faulty component location along an optical path through an optical fiber in an optical network, the optical fiber carrying a plurality of individual wavelengths, the apparatus comprising:
  (i) a detector, measuring a loss of a total wavelength power between a local detection point and a detection point adjacent to said local detection point;
  (ii) a comparator, for each pair of the local and adjacent detection points comparing the loss of the total wavelength power with a respective reference loss value for the pair, and if the total wavelengths power loss in step (i) is less than the respective reference loss value, generating a message alert signal for one or more of the following:
    a fault occurs at the local detection point,
    a fault occurs at the adjacent detection point, and
    a faulty component is located between the local detection point and the adjacent detection point;
  (iii) a detector, measuring a loss of a total wavelength power between the local detection point and a detection point, which is non-adjacent to, said local detection point;
  (iv) a comparator, for each pair of the local and non-adjacent detection points comparing the loss of the total wavelength power with a respective reference loss value for the pair, and if the total wavelengths power loss in step (iii) is less than the respective reference loss value, generating a message alert signal for one or more of the following:
    a fault occurs at the non-adjacent detection point,
    a faulty component is located between the local detection point and the adjacent detection point, and
    a faulty component is located between the local detection point and the non-adjacent detection point.

* * * * *